United States Patent [19]

Gourdine

[11] Patent Number: 5,548,907
[45] Date of Patent: Aug. 27, 1996

[54] METHOD AND APPARATUS FOR TRANSFERRING HEAT, MASS, AND MOMENTUM BETWEEN A FLUID AND A SURFACE

[75] Inventor: Meredith C. Gourdine, Houston, Tex.

[73] Assignee: Energy Innovations, Inc., Houston, Tex.

[21] Appl. No.: 113,350

[22] Filed: Aug. 30, 1993

Related U.S. Application Data

[63] Continuation-in-part of Ser. No. 397,989, Aug. 24, 1989, abandoned.

[51] Int. Cl.$^6$ ..................................................... F26B 3/00
[52] U.S. Cl. ................................. 34/448; 34/654; 34/488
[58] Field of Search ........................... 34/652, 653, 654, 34/655, 656, 448, 488

[56] References Cited

U.S. PATENT DOCUMENTS

| | | | |
|---|---|---|---|
| 2,907,119 | 10/1959 | Kane | 34/655 |
| 5,254,166 | 10/1993 | Tu | 34/655 |
| 5,294,699 | 3/1994 | Faust et al. | 34/653 X |
| 5,406,807 | 4/1995 | Ashiwake et al. | 62/376 |

FOREIGN PATENT DOCUMENTS

| 2458001 | 6/1976 | Germany | 34/656 |
|---|---|---|---|

Primary Examiner—Henry A. Bennett
Assistant Examiner—Susanne C. Tinker
Attorney, Agent, or Firm—Kenneth A. Roddy

[57] ABSTRACT

Several methods and apparatus for transferring heat, mass and momentum between a fluid and a surface are disclosed wherein the fluid is separated into a multiplicity of tiny jets that impinge upon a surface to be treated and flow across it for very short distances before reforming jets that leave the surface. While in contact with the surface, the fluid flow is laminar and the boundary layer that resists transfer of heat, mass and momentum is extremely thin. Hence, heat, mass and momentum transfer coefficients are large and predictable from first principles of physics. The pressure drop and fan power required to form these jets are generally less than that required to drive the flow parallel to the surface for long distances, where the boundary layer grows much thicker. Several examples and applications describe the versatility and increased effectiveness of the present method including fluid/surface heat transfer, fluid/fluid heat transfer, surface propulsion, surface levitation, surface skin drag and skin heating reduction, surface drying, surface cleaning, hair drying, ice melting, surface coating, surface chemical reactions, surface phase-change reactions, clean efficient coal combustion, air pollution control, and particle separation from fluids.

28 Claims, 15 Drawing Sheets

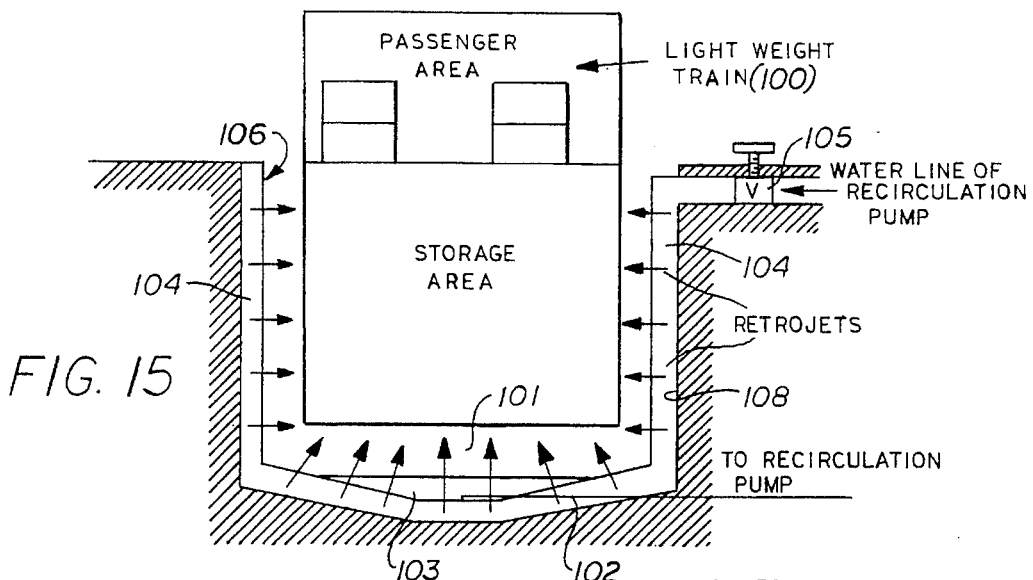
FIG. 15
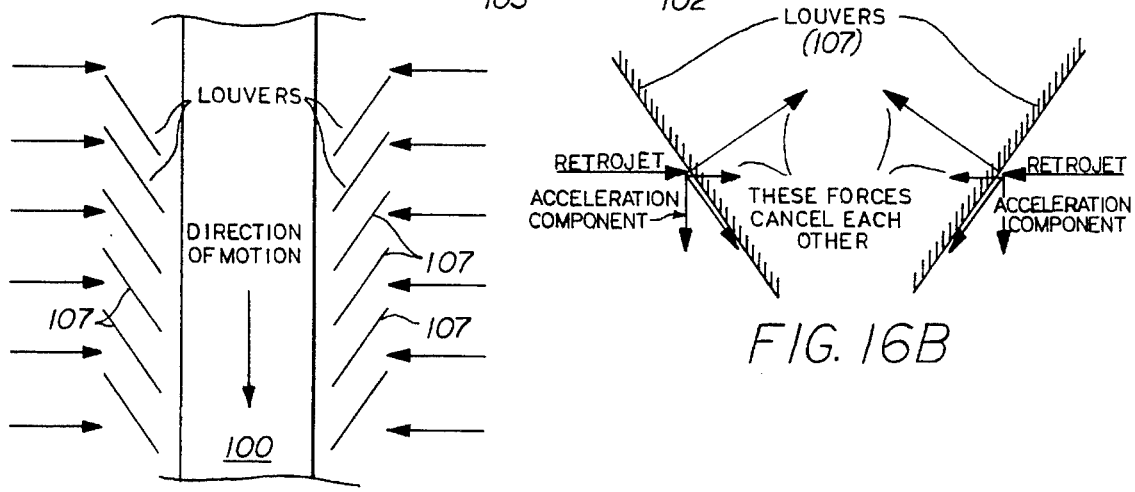
FIG. 16A
FIG. 16B
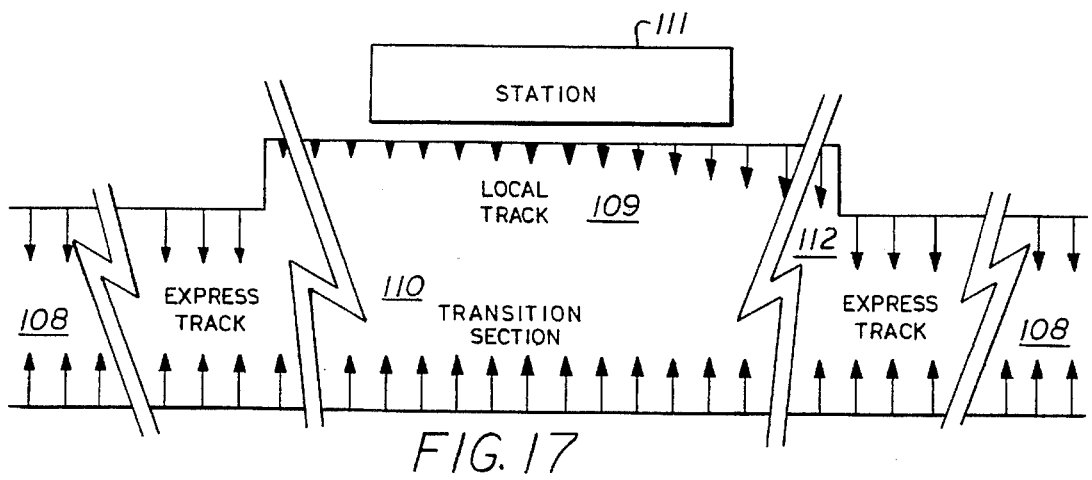
FIG. 17

1

METHOD AND APPARATUS FOR TRANSFERRING HEAT, MASS, AND MOMENTUM BETWEEN A FLUID AND A SURFACE

This application is a C.I.P. of Ser. No. 07/397,989 filed Aug. 24, 1989 now abandoned.

BACKGROUND OF THE INVENTION

1. Field of the Invention

This invention relates generally to methods and apparatus for transferring heat, mass and momentum between a fluid and a surface, and more particularly to methods and apparatus for transferring heat, mass and momentum between a fluid and a surface in which the fluid is separated into a multiplicity of tiny jets that impinge upon the surface and flow across it for very short distances before reforming jets that leave the surface.

2. Brief Description of the Prior Art

Generally, heat is transferred from a hot surface to a cold fluid (gas or liquid) by molecules that strike the surface, then rebound from it with increased thermal energy. Engineers usually apply this basic principle by allowing the fluid to flow along the surface, but the complexity of the flow defies mathematical description.

Conventionally, the fluid flows parallel to the surface and each fluid element becomes hotter and hotter as it flows across the hot surface; therefore it becomes less capable of taking heat from the surface as it proceeds because the temperature difference between the fluid and the surface decreases. Also, there is a thermal boundary layer that grows with distance from the leading edge, and the thicker the boundary layer the greater the resistance to the transfer of heat from the surface to the fluid. The laminar boundary layer at some critical distance from the leading edge makes a transition to a turbulent boundary layer. In this regime, the heat transfer rate is considerably increased. However, the further the fluid travels along the surface, opposed by wall friction, the greater the pressure drop and requirement for pump power. The physics of the problem is such that engineers use mean values and empirical relations to design such systems.

U.S. Pat. Nos. 4,471,000, 4,489,506, and 4,956,271 assigned to Wolverine Corportation of Merrimac, Mass., disclose apparatus utilizing tubes to direct jets of air on or into a medium and then suck the exhaust back through spaces between the tubes. The incoming jets merely diffuse through the spaces between the particles in the treated medium and the surfaces of those particles are treated by the molecules that strike it due to the turbulent diffusion. The present invention, on the other hand, establishes thin laminar boundary layers having high heat, mass, and/or momentum transfer rates, and high efficiency, thus requiring much less fan power because the pressure drop associated with those laminar boundary layers is at a minimum.

U.S. Pat. Nos. 4,201,499 and 4,776,107, also assigned to Wolverine Corporation of Merrimac, Mass., disclose apparatus utilizing tubes to direct jets of gas onto a medium wherein the flow from the tubs is not constrained to flow for any appreciable distance along the surface of the medium before it turns away and flows back between the tubes. This is a rather inefficient use of the gas, compared to the present invention wherein inlet jets emerging from a surface that confines the flow of the jets along the treatment surface which is in close proximity. The present invention also allows the flow from neighboring jets to interact on the surface to form outlet jets, and the length of those flows is always large compared to the diameter of the jets, both inlet and outlet. This is what assures high efficiency of heat, mass, and/or momentum transfer.

The present invention is distinguished over the prior art methods in general by a method for transferring heat, mass and momentum between a fluid and a surface. Instead of the usual approach in which the fluid is made to flow parallel to the surface, the present apparatus and method separates the fluid into a multiplicity of tiny jets that impinge upon the surface and flow across it for very short distances before reforming jets that leave the surface. While in contact with the surface, the fluid flow is laminar and the boundary layer that resists transfer of heat, mass and momentum is extremely thin. Hence, heat, mass and momentum transfer coefficients are large and predictable from first principles of physics. The pressure drop and fan power required to form these jets are generally less than that required to drive the flow parallel to the surface for long distances, where the boundary layer grows much thicker. The present method and apparatus has applications in a variety of fields including; fluid/surface heat transfer, fluid/fluid heat transfer, surface propulsion, surface levitation, surface skin drag and skin heating reduction, surface drying, surface cleaning, hair drying, ice melting, surface coating, surface chemical reactions, surface phase-change reactions, clean efficient coal combustion, air pollution control, and particle separation from fluids.

SUMMARY OF THE INVENTION

It is therefore an object of the present invention to provide an improved method and apparatus for transferring heat, mass and momentum between a fluid and a surface.

It is another object of this invention to provide a method and apparatus for transferring heat, mass and momentum between a fluid and a surface wherein the heat and mass transfer coefficients are very large where the fluid first contacts the surface, and the distance the fluid remains in contact with the surface is very short to provide a thin boundary layer such that the fluid does not lose much momentum overcoming the friction on the wall because the length of travel is so short.

Another object of this invention is to provide a method and apparatus for transferring heat, mass and momentum between a fluid and a surface wherein the fluid flow is broken up into small jets that impinge on the surface to be treated, flow along it for short distances, then leave the surface.

Another object of this invention is to provide a method and apparatus for transferring heat, mass and momentum between a fluid and a surface wherein the fluid flow is broken up into small jets that impinge on the surface to be treated and the flow from each impinging jet is in all directions, such that the net friction force on the surface is zero.

Another object of this invention is to provide a method and apparatus for transferring heat, mass and momentum between a fluid and a surface wherein the fluid flow is broken up into small jets that impinge on the surface to be treated whereby the heat transfer coefficient associated with a single small jet depends only on the properties of the fluid and the contact distance.

Another object of this invention is to provide a method and apparatus for transferring heat, mass and momentum between a fluid and a surface wherein the fluid flow is broken up into an array of small jets that impinge on the surface to be treated, with outlet jets between them, whereby the local heat transfer coefficient is the same everywhere across the surface.

Another object of this invention is to provide a method and apparatus for transferring heat, mass and momentum between a fluid and a surface wherein the fluid flow is broken up into an array of small jets that impinge on the surface to be treated, and the parameters of the jets may be varied in a predetermined fashion to achieve particular distributions of the values of the local heat transfer coefficient; e.g. either the velocity of individual jets, or the diameter, or their distance between centers can be varied.

Another object of this invention is to provide a method and apparatus for transferring heat, mass and momentum between a fluid and a surface which allows for mass transfer of molecular species, as well as heat transfer whereby phase change in chemical chain reactions can be controlled.

Another object of this invention is to provide a method and apparatus wherein a fluid flow is broken up into an array of small jets that impinge on a surface to levitate or propel the surface.

Another object of this invention is to provide a method and apparatus wherein a fluid flow is broken up into an array of small jets that are used to apply liquid or powder paints.

Another object of this invention is to provide a method and apparatus wherein a fluid flow is broken up into an array of small jets that impinge on a surface to establish a boundary layer on the surface that reduces skin friction and skin heating.

Another object of this invention is to provide a method and apparatus wherein a fluid flow is broken up into an array of small jets that impinge on a surface to control phase change and chemical reactions on surfaces such as separation of fine liquid or solid particulates from gases.

Another object of this invention is to provide a method and apparatus wherein a fluid flow is broken up into an array of small jets that impinge on a surface to accomplish highly efficient surface drying and cleaning.

Another object of this invention is to provide a method and apparatus wherein a fluid flow is broken up into an array of small jets that impinge on a surface to accomplish clean and efficient coal combustion.

Another object of this invention is to provide a method and apparatus wherein a fluid flow is broken up into an array of small jets that impinge on a surface to control air pollution.

Other objects of the invention will become apparent from time to time throughout the specification and claims as hereinafter related.

The above noted objects and other objects of the invention are accomplished by the present method and apparatus wherein a large volumetric flow rate of fluid is separated into a multiplicity of tiny jets emerging from a first surface and impinge on a second surface. The fluid flows only a short distance on the second surface before merging with other jets to form outlet jets that leave the second surface while the fluid flows across the second surface. Laminar boundary layers grow and have the effect of inhibiting the transfer of heat, mass and momentum from second surface to the fluid. The laminar boundary layers are very thin due to the short length of contact, consequently, rates of transfer of heat, mass and momentum are very high compared to that achieved when fluid is in contact with the surface for long distances and the boundary layers are much thicker. Thus, with the present method and apparatus, a certain mass flow rate of fluid is forced to flow over a surface in order to transfer a certain amount of heat or mass, and more heat or mass can be transferred with the same flow rate by breaking it up into small jets that impinge normal to the surface to be treated and flow across it for short distances before being sucked off the surface again as normal jets. The fan power required to overcome the pressure drop associated with these small jets is usually less than that required to overcome the friction force associated with parallel flow for much longer distances over a surface.

BRIEF DESCRIPTION OF THE DRAWINGS

FIG. 15 is a cross section showing schematically a train being levitated and centered within a track, using water retrojets.

FIG. 16A is a schematic top view showing the train being accelerated by retrojets from the side walls of the track.

FIG. 16B is an enlarged schematic view of the louver arrangement of FIG. 16A showing accelerating force caused by the retrojets on louvers on the sides of the train.

FIG. 17 is a schematic top view showing how the water retrojets can be used to transfer the train between express and local tracks.

DESCRIPTION OF PREFERRED EMBODIMENTS

Figure 1A:
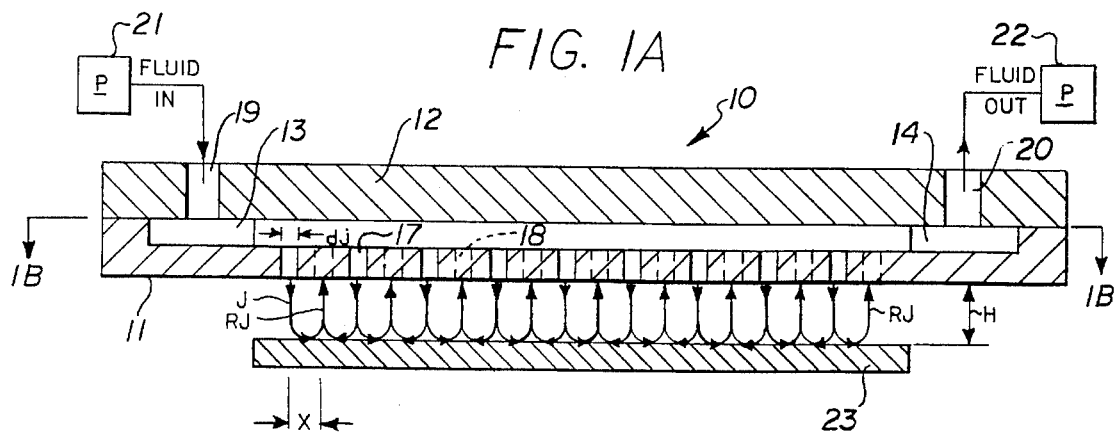
FIG. 1A is a cross sectional side view of an apparatus for breaking a fluid flow up into small jets that impinge on a surface to be treated, flow along it for short distances, then leave the surface.
Figure 1B:
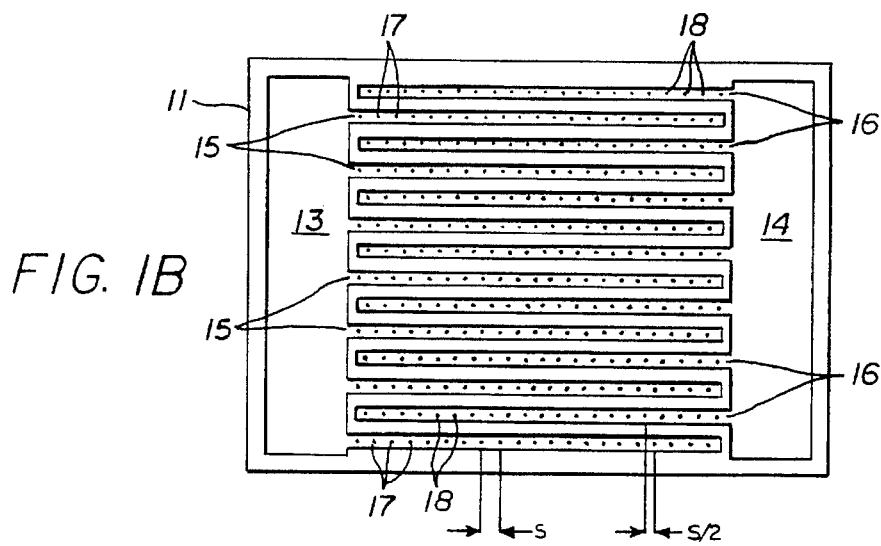
FIG. 1B is a top plan view of the inlet-outlet plate of the apparatus of FIG. 1A.

Referring to the drawings by numerals of reference, there is shown in FIGS. 1A and 1B, a "retrojet" apparatus 10 for breaking a fluid flow up into small jets J that impinge on a surface to be treated, flow along it for short distances, then leave the surface in the form of small return jets called "retrojets" RJ, as described in detail hereinafter. As seen in FIG. 1A, the apparatus 10 has an inlet/outlet plate 11 and a top plate 12 which are secured together in parallel relation. As seen in FIG. 1B, one surface of the inlet/outlet plate 11 is recessed to form a generally rectangular fluid inlet reservoir 13 and a rectangular fluid outlet reservoir 14 near opposite sides of the plate. A series of parallel spaced recessed fluid inlet channels 15 extend across the plate 11 from the inlet reservoir 13 and terminate near the outlet reservoir 14. A series of parallel spaced recessed fluid outlet channels 16 extend across the plate 11 from the outlet reservoir 14 and terminate near the inlet reservoir 13. The fluid outlet channels 16 are disposed between the fluid inlet channels 15 in alternating parallel spaced relation.

A plurality of adjacent spaced apart inlet orifices 17 formed in the inlet channels 15 and a plurality of spaced apart outlet orifices 18 formed in the outlet channels 16 extend through the plate 11 to the exterior. The inlet orifices 17 have a diameter $d_j$ and are spaced apart a distance S between centers to form a square array (as in FIG. 1B). The outlet orifices 18 form a similar square array and are displaced from the inlet orifices 17 in both directions by a distance S/2.

The recessed fluid reservoirs 13 and 14, and channels 15 and 16 are enclosed by the top plate 12. The top plate 12 has a fluid inlet port 19 and a fluid outlet port 20 in fluid communication with the fluid inlet reservoir 13 and fluid outlet reservoir 14, respectively. A fluid pump 21 connected to the fluid inlet port 19 by conduit supplies fluid to the inlet reservoir 13 and another pump 22 connected by conduit to the fluid outlet reservoir 14 draws fluid from the outlet reservoir.

In operation, as shown somewhat schematically in FIG. 1A, a treatment surface 23 is positioned a distance H from the bottom of the inlet/outlet plate 11. As indicated by arrows, the fluid from the inlet orifices 17 strike the treatment surface 23 as impinging jets J which coalesce and travel a distance X across the treatment surface before being drawn into the outlet orifices 18 as return or retrojets RJ.

Figure 1C:
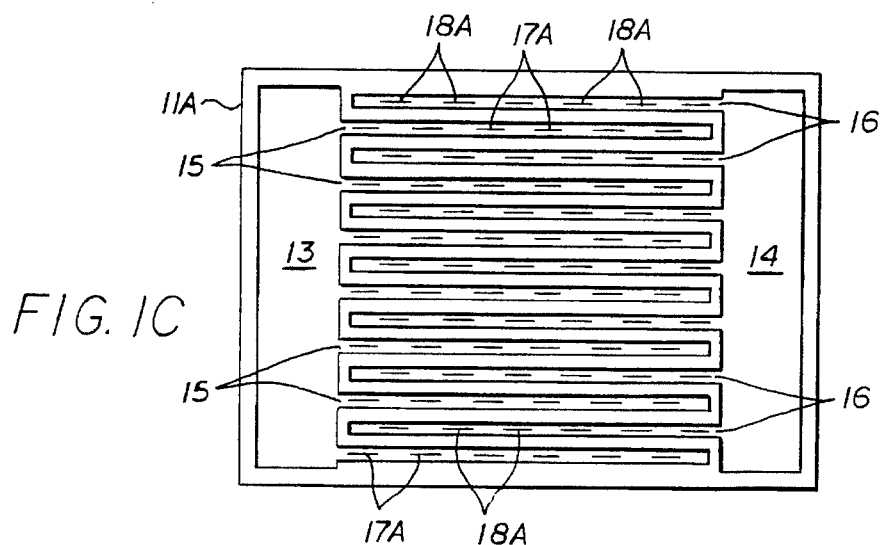
FIG. 1C is a top plan view of an alternate inlet-outlet plate wherein the inlet and outlet orifices are slots rather than holes.

FIG. 1C is a top plan view of an alternate inlet-outlet plate 11A wherein the inlet and outlet orifices are slots rather than holes. As previously described with reference to FIG. 1B, the inlet/outlet plate 11A has the same fluid inlet reservoir 13 and fluid outlet reservoir 14 near opposite sides of the plate and a series of parallel spaced recessed fluid inlet channels 15 extend across the plate 11A from the inlet reservoir 13 and terminate near the outlet reservoir 14. A series of parallel spaced recessed fluid outlet channels 16 extend across the plate 11A from the outlet reservoir 14 and terminate near the inlet reservoir 13 alternating parallel spaced relation to the inlet channels 15. A plurality of spaced apart inlet slots 17A formed in the inlet channels 15 and a plurality of spaced apart outlet slots 18A formed in the outlet channels 16 extend through the plate 11A to the exterior. In this embodiment, the fluid is directed onto the treatment surface 23 by the slots 17A and return via the slots 18A.

Figure 2:
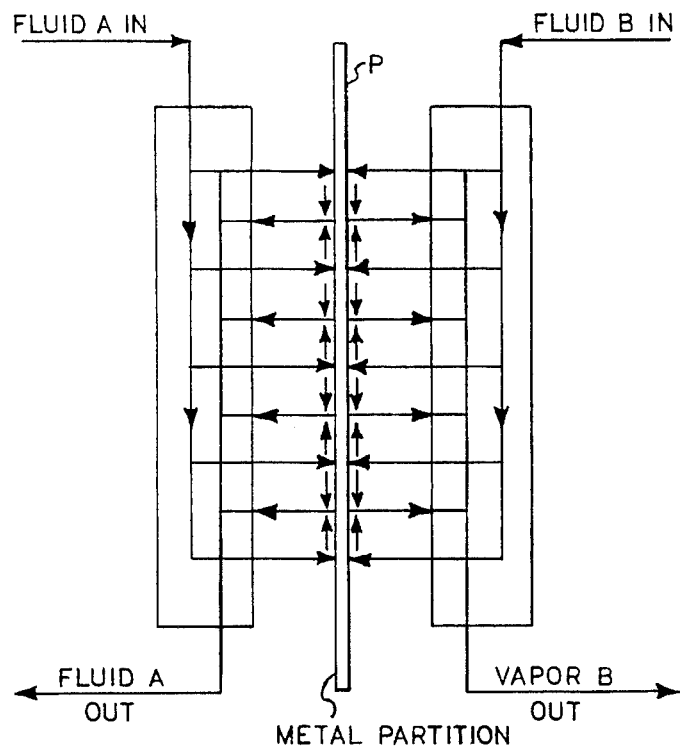
FIG. 2 is a schematic illustration of a pair of the devices of FIG. 1A used as a fluid-to-fluid heat exchanger in which heat is transferred from a first fluid to a second fluid through a thin metal partition that separates the two devices.

FIG. 2 illustrates schematically how a pair of the "retrojet" devices 10 of FIG. 1A may be used as a fluid-to-fluid heat exchanger in which heat is transferred from a first fluid A to a second fluid B through a thin metal partition P that separates the two devices. For example, in an air conditioning system, jets of a warm and humid fluid A (air) can be introduced on one side (left side) of the separator partition P and jets of a refrigerant fluid B introduced on the other side of the partition. The warm and humid fluid A is drawn off as a cool and dry fluid after delivering heat to one side of the partition P, which is cooled on the other side by jets of refrigerant that partially or totally evaporate as they flow over that side of the separator partition. If both sides of the heat exchanger are adjusted to run efficiently, then the exhaust at both sides is close to the temperature of the separator partition P. The temperature of the separator partition P is somewhere between the inlet temperature of the two fluids, depending upon the mass flow rate and heat capacity of the two fluids. However, if fluid B is evaporating at a constant pressure and temperature, this determines the temperature of the separator partition P and the outlet temperature of fluid A.

One of the advantages of the present device compared to conventional fluid-to-fluid heat exchangers is that the high heat transfer coefficient on both sides of the separator partition makes it possible to achieve very high thermal flux, consequently requiring less area to transfer heat at any desired rate. Since the devices themselves are relatively thin; size, weight, and cost are all reduced.

Figure 3:
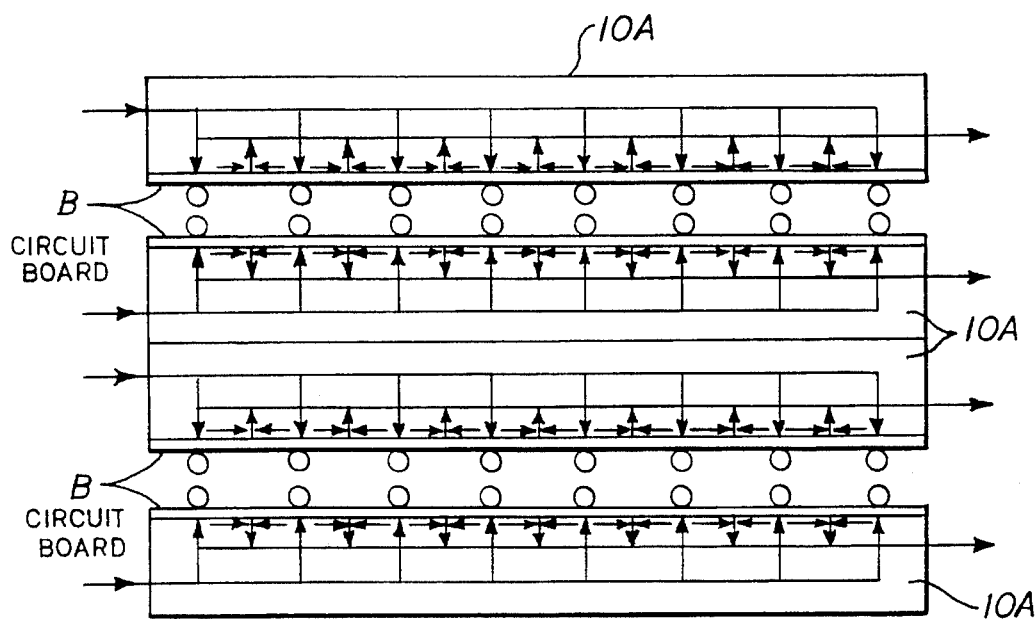
FIG. 3 is a schematic illustration of how a series of the devices of FIG. 1A may be used to transfer heat from a stack of electronic circuit boards.

FIG. 3 illustrates schematically how a series of the "retrojet" devices 10A of FIG. 1A may be used to transfer heat from a stack of electronic circuit boards by driving cooling air through the stack. The retrojet devices 10A are modified by eliminating the reservoirs at opposite ends. The devices 10A are stacked with electronic circuit boards B in between them. The circuit boards B are back-to-back sandwiched between the retrojet devices 10A back to back; i.e. the retrojet devices 10A spray from both sides against the thin dielectric boards upon which the electronic components are mounted. A fan (not shown) is connected to the inlet channel of the devices to drive air through the stack of circuit boards, while another fan connected to the outlet channels extracts air from the stack carrying the heat generated by the densely packed electronic components. Thus, the electronic components face each other and their bases are cooled by the retrojets.

There are several advantages of the present "retrojet" apparatus and electronic cooling method over other approaches:

(A) The size of the retrojet orifices and/or spacing, can be programmed to match the rate in which the components will be generating heat. This is difficult to do with conventional metal heat sinks, or liquid cooled metal heat sinks, because they have temperature gradients that depend on the rate at which other components are emitting heat, and the path the heat must take out of the heat sink.

(B) The heat fluxes can be much higher with the present system because the heat transfer coefficient to the air is much higher, thus allowing a more compact electronic package with any given amount of power.

(C) Conventional electronic packages often use metal heat sinks with passages for the flow of a liquid that carries heat to tube-fin heat exchangers that are cooled by air. The present "retrojet" system eliminates this intermediate step, and reduces the installation and operational cost.

(D) Design of the circuit boards, their stacking, and interconnections depend very strongly upon available systems for removing heat, especially for hot spots; therefore, retrojet cooling provides the designer with more flexibility.

(E) Reliability of the components is highly dependent upon their operating temperature. The theory of "retrojet" cooling can be programmed into a computer that will design the system to keep each component within its prescribed temperature range. Conventional systems are not so well mathematically prescribed and their designs depend to a large extent on past experiences.

(F) "Retrojet" cooling involves the constructive use of jets for impingement cooling; i.e., the laminar boundary layer is maintained and there is no interference between adjacent jets. This results in high heat transfer coefficients.

A comparative study of the differences between the present "retrojet" system and a conventional jet impingement method was done using data from an article titled "Air-Jet Impingement Keeps Computer Cool" published in the May 1987 issue of *Electronic Packaging and Production*. Experiments were conducted using a "retrojet" device having the same dimensions and parameters as the device in the article. The "retrojet" device constructed was 2.5"×2.5" having 64 holes in an 8×8 array on 0.31' centers. The tests were conducted by having air inlet of 53° C., and surface temperature on which the jets impinged at 95° C., as in the above mentioned article. The heat that needed to be transferred to the air was 90 W. The results of the comparison of the various characteristics of the "retrojet" device to the information provided in the article is given in the table below.

| Characteristics | Unit | "Retrojet" | Impingement |
| --- | --- | --- | --- |
| Efficiency: | % | 66 | 22 |
| Air flow rate: | kg/s | 0.0015 | 0.0045 |
| Pressure drop: | psi | 10 | 100 |
| Fan power: | W | 90 | 2700 |
| Heat Exchanger size: | | very small | large |

Figure 4:
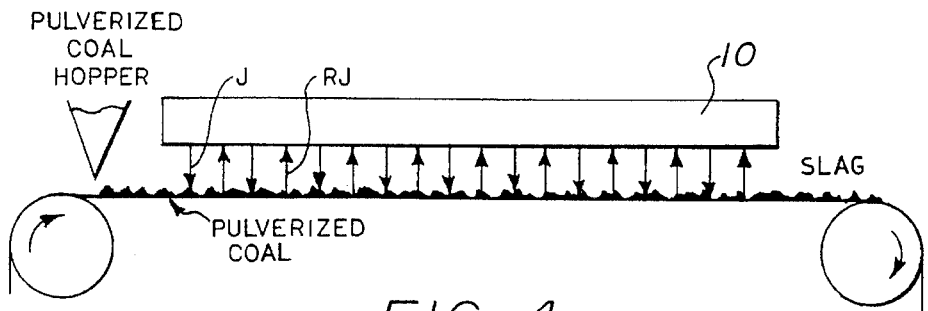
FIG. 4 is a schematic illustration of a compact, efficient, and clean coal combustor using "retrojet" devices.

FIG. 4 illustrates schematically how the "retrojet" devices 10 can be used to burn pulverized coal cleanly, efficiently, and in a very compact system. The pulverized coal is fed from a pressurized hopper onto the surface of molten slag where it spreads out and floats due its lower density. The slag and pulverized coal pass under the retrojet device by means of a conveyor. The incoming jets J of air impinge upon the hot coal, then flow for short distances across the surface, and in the process, oxygen is consumed and carbon dioxide is produced. The gas, consisting mostly of nitrogen, picks up the heat of combustion and carries it away as return jets or retrojets through the outlet orifices.

Figure 5A:
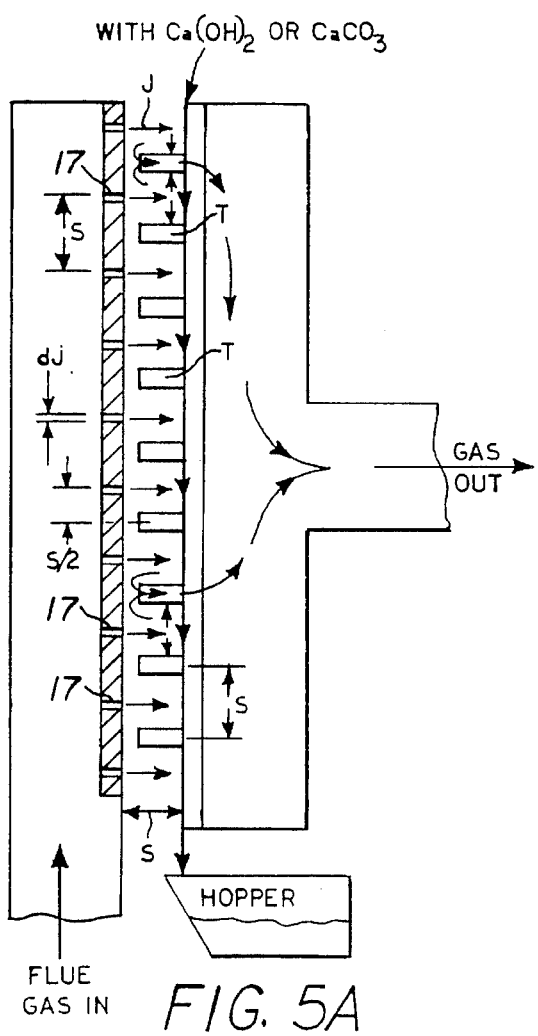
FIG. 5 is a schematic illustration showing how sulfur dioxide ($SO_2$) can be removed from flue gas utilizing a "retrojet" device.
Figure 5B:
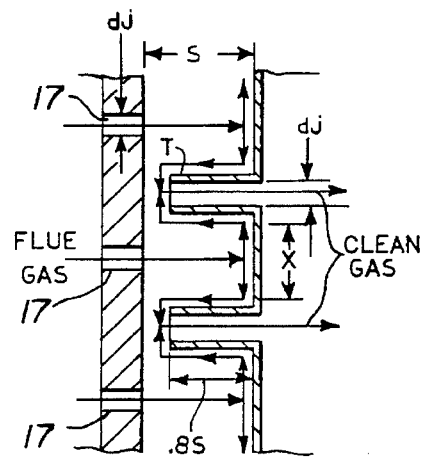

FIGS. 5A and 5B show schematically how a "retrojet" device can be used to remove sulfur dioxide ($SO_2$) from flue gas. Flue gas flows vertically up the inlet duct, and is forced to an array of orifices 17 having a diameter $d_j$ with distance between centers S to form tiny jets J that travel a distance approximately S before impinging on a film of water containing in solution either calcium hydroxide or calcium carbonate. These jets turn and travel a short distance X before turning again and running along the walls of metal tubes T protruding from the treatment wall a distance approximately 0.8 S. In the turning process, high mass transfer coefficient causes $SO_2$ molecules to be captured in the film and converted to calcium sulfate or calcium sulfide particles that are carried by the film down the wall and into the hopper. The clean jets turn again at the inlets of the protruding tubes, then flow through the tubes and into the outlet duct where the clean gas then flows out. These thin protruding tubes have thin walls and an internal diameter $d_j$ with their centers S apart, but displaced S/2 in both directions from the inlet jets J. The fluid is injected at the top of the treatment wall through a narrow slot along the treatment surface. Fluid viscosity and centrifugal force exerted by the turning jets keeps the fluid and the particles against the treatment wall. Large volumes of gas can be cleaned in this way by installing a large number of these devices at the top of a large inlet duct and then leading the streams of clean flue gas into an equally large outlet duct at the top of these devices. Thus, the flow in the large duct is split into thin streams of flue gas that are then split into numerous jets for efficient cleaning. The outlet jets then form thin streams of clean flue gas that enter the large outlet duct above.

Figure 6:
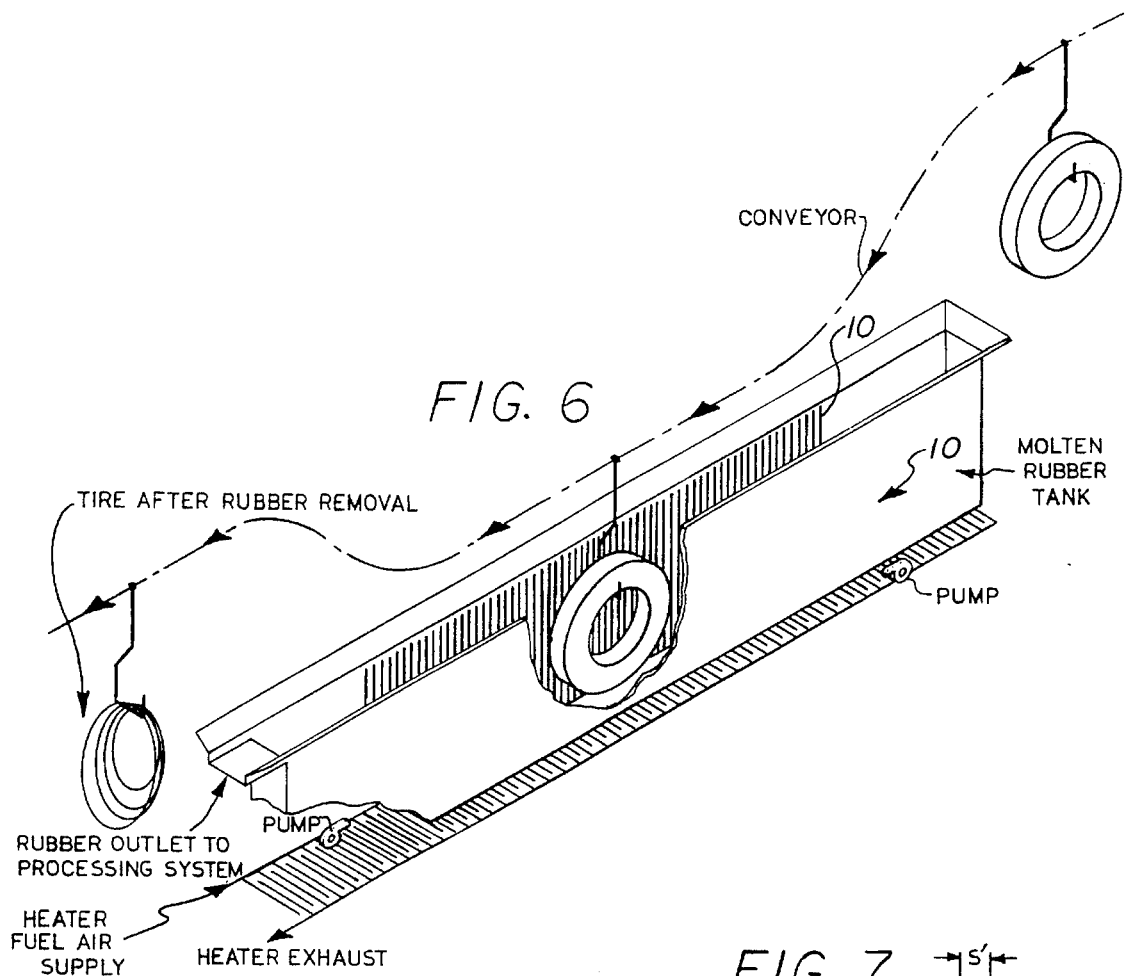
FIG. 6 is a schematic illustration of the use of a "retrojet" device for depolymerisation of rubber

FIG. 6 shows schematically how retrojet devices 10 using depolymerized rubber and/or aromatic oil can be used to attack the surface of rubber tires being conveyed through a bath of this hot liquid. The surface of the tires, heated by the jets J (FIG. 1A) swells as it absorbs some of the oil, and is ripped from the surface by the shear stress of the high speed jets, thereby exposing a new surface, until nothing remains but the tire carcass. As oil is added to the bath, it is continuously drained from the tank as a valuable liquid fuel.

The action of the retrojets is very effective because each inlet jet strikes the tire surface at high velocity and spreads for a short distance across the surface before forming outlet jets RJ with fluid coming from neighboring inlet jets J as shown in FIG. 1A. The heat, mass, and momentum transfer rates at the stagnation points of these inlet jets are enormous, and this causes a rapid transformation of the vulcanized rubber (sulfur cross-linked polymers) to depolymerized rubber (oil) at the surface.

With the addition of selected chemicals like limestone powder, it is possible to convert the sulfur in the vulcanized rubber to inert compounds like calcium sulfide that can be separated from the oil by filtration. Even without this "sweetening" step, this DSR has less sulfur content than most coals and oils (approximately 1%).

Retrojets can be used to deliver power to the surface of the rubber in three ways: (1) by heat transfer, (2) by mass transfer of chemicals that react with the sulfur that causes cross-linking, and (3) by momentum transfer that stresses the surface and causes it to tear. The heat transfer rate is increased by increasing the inlet temperature of the jets relative to the bath, chemical mass transfer rates are increased by increasing chemical concentrations like sodium or calcium atoms that directly attack sulfur to form sodium sulfide or calcium sulfide that can be precipitated as particles, and momentum transfer rate (shear stress) can be increased by increasing the speed of the jets by increasing pump power. High temperature at the surface and high stress at the surface can destroy the polymer bonds carbon-carbon and carbon-hydrogen as well as the cross-linking bonds carbon-sulfur and sulfur-sulfur, while chemical mass transfer can be directed to destroy only the cross-linking bonds.

Figure 7:
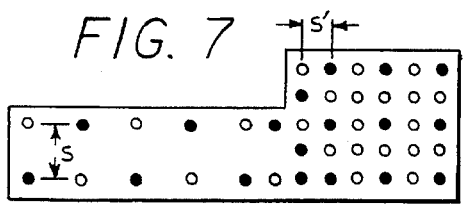
FIG. 7 is a schematic cross sectional view of an extruded hot metal plate quenched by "retrojets".

FIG. 7 shows schematically how retrojet devices can be used to quench hot extrusions of varying thickness without inducing distortions due to uneven cooling. As an example, consider an L shape extrusion with one leg much thicker than the other. The flow pattern, shown schematically illustrates a cold fluid only (black dots) flowing in alternate passageways (into the paper) with hot fluid (white dots) flowing (out of the paper) in passageways between the inlet passageways (black dots). Note that the distance between centers of these passageways S' is much smaller where the jets must impinge thick materials than it is where the jets must impinge thin materials S. This makes X smaller and H larger where the material is thick, and X is larger and H is smaller where the material is thin (FIG. 1A). Using this technique, even very complicated extrusions can be quenched without distortion. Any fluid can be used for quenching; i.e. water, air, or oil. High pressure sonic jets of air are most convenient because they pose no environmental problems and the heat transfer coefficient is sufficiently high to have the length of the quenching station quite reasonable. It should also be noted that the jets act as a lubricant between the extrusion and the wall.

Figure 8A:
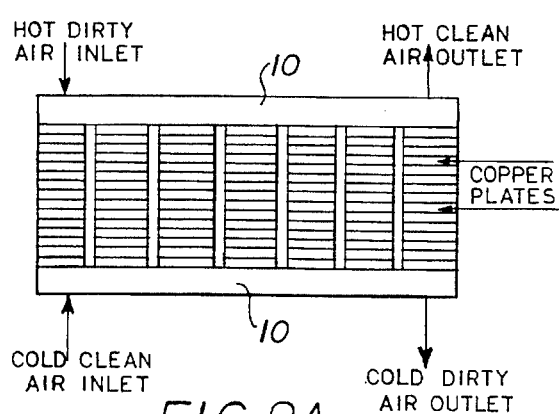
FIG. 8A is a schematic illustration of "retrojet" devices being used to transfer heat between two fluids in a laminated counterflow heat exchanger.
Figure 8B:
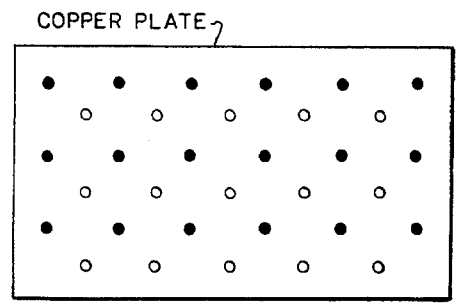
FIG. 8B is a schematic plan view of a heat exchanger plate used in the laminated counterflow heat exchanger of FIG. 8A.

FIGS. 8A and 8B illustrate schematically how heat can be transferred from one fluid to another using retrojet devices in a laminated counterflow heat exchanger. The heat exchanger includes two retrojet devices 10 facing one another with a plurality of thin copper plates disposed therebetween. As seen in FIG. 8B, the thin copper plates are provided with inlet holes (black dots) and outlet holes (clear dots). The copper plates are painted with an insulating material to prevent axial heat transfer from taking place and allowing only lateral heat transfer. Referring additionally to FIG. 1A, a hot fluid enters through the fluid inlet reservoir 13 of the first (upper) retrojet device, goes through the fluid inlet channels 15 and orifices 17 into the inlet holes (black dots) of the plates. It transfers heat laterally through the copper plates to a cold fluid passing through adjacent outlet holes (white dots). This cold fluid enters from the second (lower) retrojet device 10. The hot fluid, after transferring heat, enters the outlet orifices 18 and channels 16 of the second (lower) retrojet device 10 where, as the cold fluid after receiving heat, enters the outlet orifices 16 and channels 18 of the first (upper) retrojet device 10 and exits the system.

In many applications it is advantageous to have adjacent fluid inlet jets rotating in opposite directions so they roll upon one another without friction as the fluid moves forward to produce counter-rotating vortices. These counter-rotating vortices persist for many additional diameters downstream when the array is large. The outlet jets form at the centers of the spaces between the vortices.

Figure 9B:
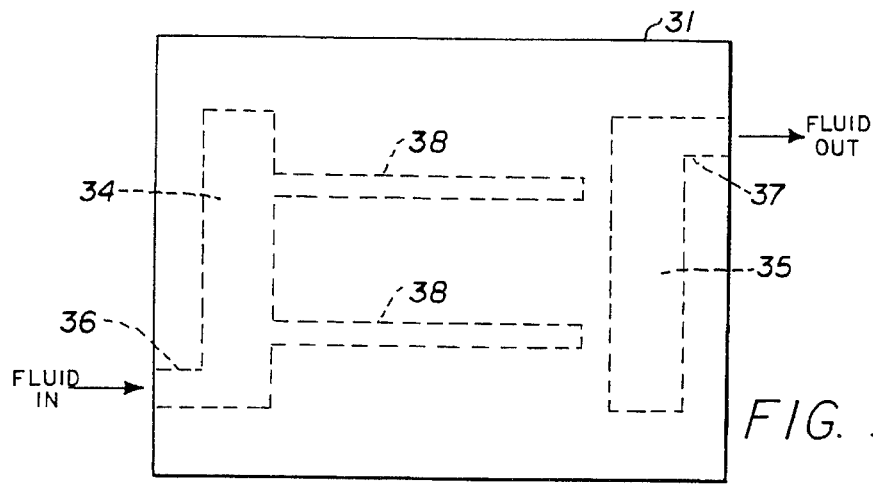
FIG. 9B is a top plan view of the inlet/outlet plate of the retrojet apparatus of FIG. 9A.
Figure 9A:
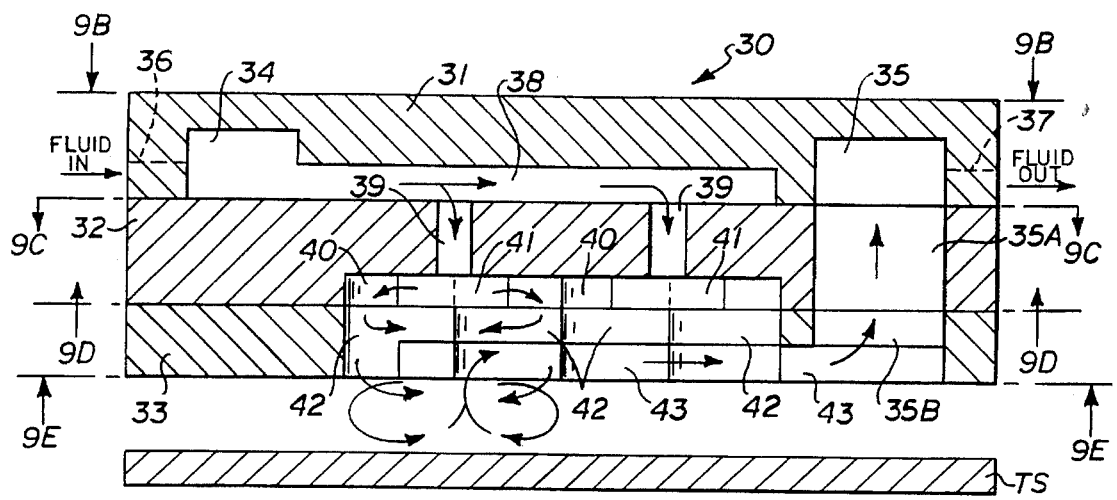
FIG. 9A is a cross section of a retrojet apparatus for producing a counter-rotating fluid vortex or "roto-retrojet".

Referring to FIGS. 9A, 9B, 9C, 9D, and 9E, a "counter-rotating retrojet" apparatus 30 is shown. As seen in FIG. 9A, the apparatus has an inlet/outlet plate 31, a vortex forming plate 32, and a vortex guide plate 33 which are secured together in parallel relation. The inlet/outlet plate 31 is shown from the top in FIG. 9B and the vortex forming plate 32 is shown from the top in FIG. 9C and from the bottom in FIG. 9D. The vortex guide plate 33 is shown from the bottom in FIG. 9E. Referring to FIGS. 9A and 9B, the underside of the inlet/outlet plate 31 is recessed near one side to form a generally rectangular fluid inlet reservoir 34 and recessed near the opposite side to form a separate generally rectangular fluid outlet reservoir 35.

A fluid inlet port 36 and a fluid outlet port 37 extend through the side wall of the inlet/outlet plate 31 in fluid communication with the fluid inlet reservoir 34 and fluid outlet reservoir 35, respectively, and are connected to a fluid inlet pump and a fluid outlet pump (not shown) to supply fluid to the inlet reservoir and draw fluid from the outlet reservoir, respectively. A pair of parallel spaced rectangular recesses or channels 38 connected at one end to the fluid inlet reservoir 34 extend across the underside surface of the inlet/outlet plate 31 and terminate near the inward side of the outlet reservoir 35.

Figure 9C:
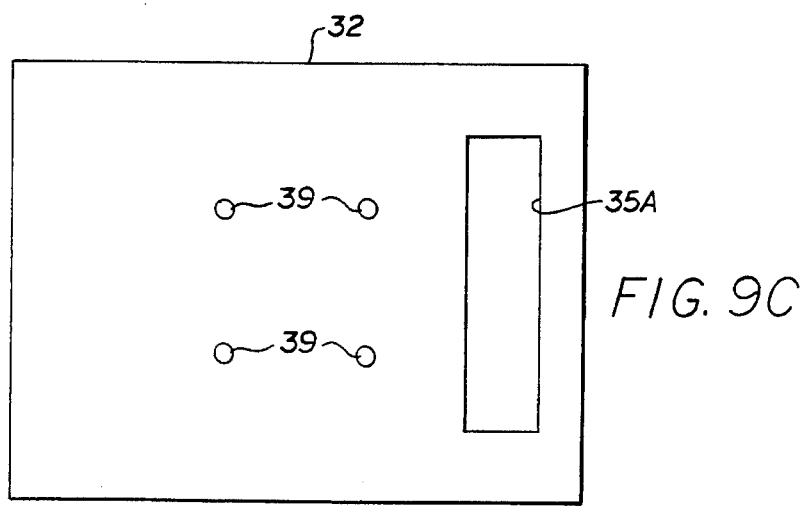
FIGS. 9C and 9D are top and bottom plan views, respectively, of the vortex forming plate of the retrojet apparatus of FIG. 9A.
Figure 9D:
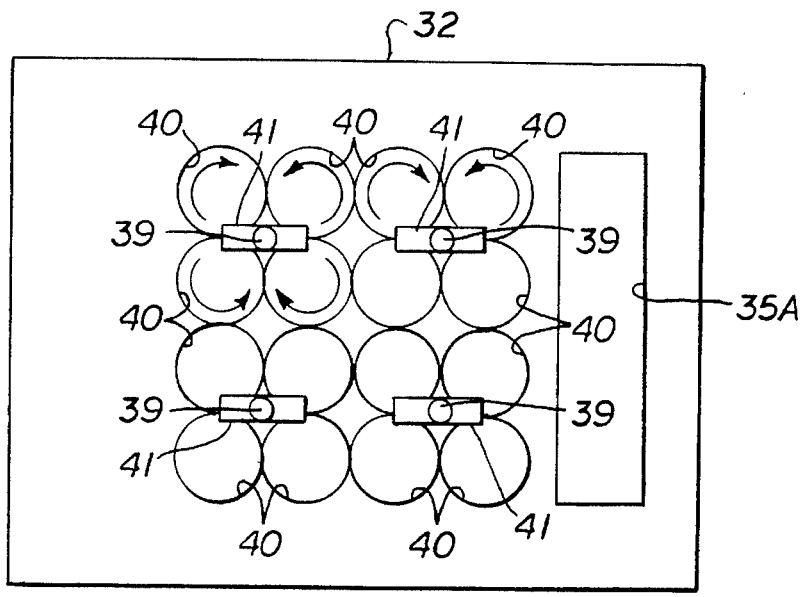

As seen in FIGS. 9A, 9C, and 9D, the vortex forming plate 32 has a rectangular aperture 35A near one side which mates with the rectangular recess 35 of the inlet/outlet plate 31 and forms an extension of the outlet reservoir 35. A series of parallel spaced holes 39 extend through the vortex forming plate 32. The underside (FIG. 9D) of the vortex forming plate 32 engaged with the vortex guide plate 33 has a series of adjacent circular recesses 40 which are tangent to one another. The outer periphery of adjacent pairs of the circular recesses 40 are connected by rectangular slots or channels 41. The holes 39 which extend through the vortex forming plate 32 are located in the spaces between adjacent pairs of the tangent circular recesses 40 and connect the longitudinal axis of the channels 38 of the inlet/outlet plate 31 and the longitudinal axis of the channels 41 on the underside of the plate vortex forming plate.

Figure 9E:
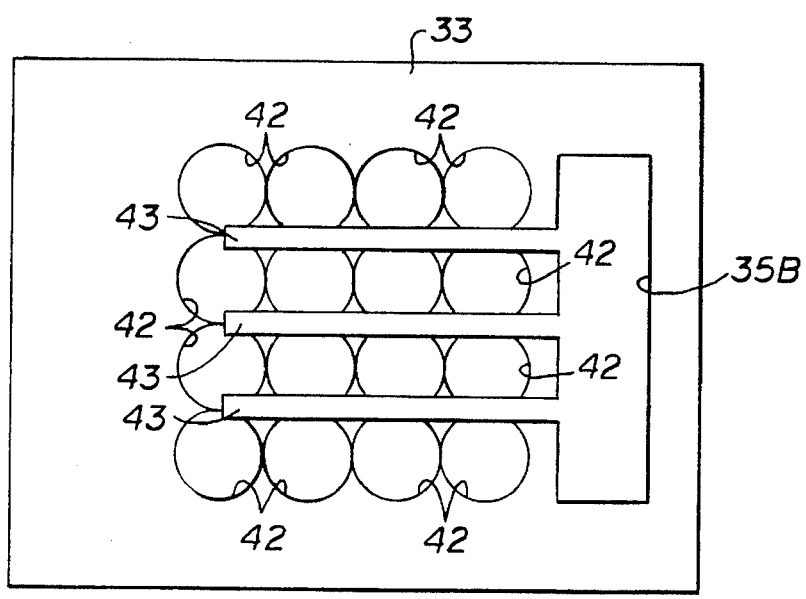
FIG. 9E is a bottom plan view of the vortex guide plate of the retrojet apparatus of FIG. 9A.

As seen in FIGS. 9A and 9E, the surface of the vortex guide plate 33 engaged with the vortex forming plate 32 has a rectangular recess 35B near one side which mates with the rectangular aperture 35A of the vortex forming plate 32 and forms the bottom portion of the outlet reservoir 35. A series of adjacent circular vortex holes 42 extend through the vortex guide plate 33. The circular vortex holes 42 are tangent to one another and axially aligned with the circular recesses 40 of the vortex forming plate 32. The bottom or outer surface of the vortex guide plate 33 has a series of parallel spaced rectangular recesses or channels 43 connected at one end to the rectangular recess 35B which extend across the surface of the vortex guide plate. The channels 43 connect the outer periphery of the adjacent circular vortex holes 42.

Fluid enters the inlet/outlet plate 31 through inlet port 36, fills the fluid inlet reservoir 34, and travels through channels 38 into the holes 39, enters the channels 41, and is directed tangentially into the circular recesses 40 such that the fluid spins around the circular recesses 40 in opposite directions (FIG. 9D) in any two adjacent recesses. The swirling fluid then passes into the circular vortex holes 42 in the vortex guide plate 33 and forms a counter-rotating fluid vortex field of jets that strike the treatment surface TS, flow across it for a short distance, and form non-rotating return jets. The return jets are drawn away from the treatment surface TS through the channels 43 in the vortex guide plate 33, fills the outlet reservoir 35, and is finally drawn out through the outlet port 37 in the inlet/outlet plate 31.

Figure 10A:
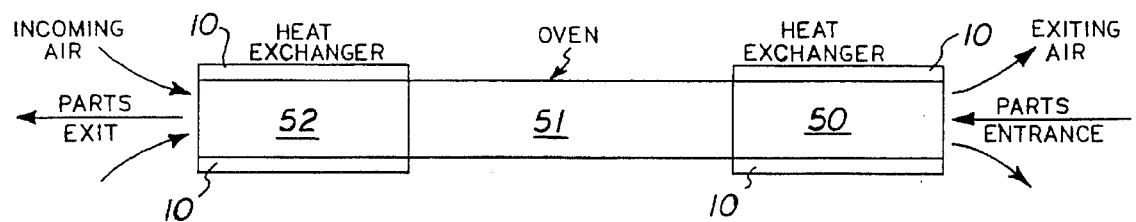
FIGS. 10A and 10B are schematic drawings of a compact and highly efficient paint curing oven using roto-retrojets in the walls of the inlet and outlet heat exchangers.
Figure 10B:
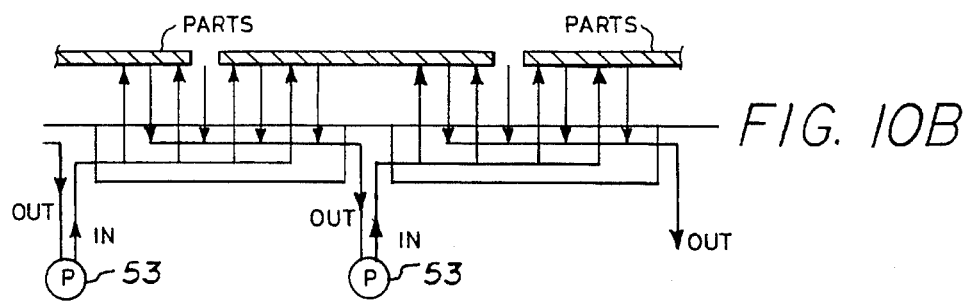
Figure 10C:
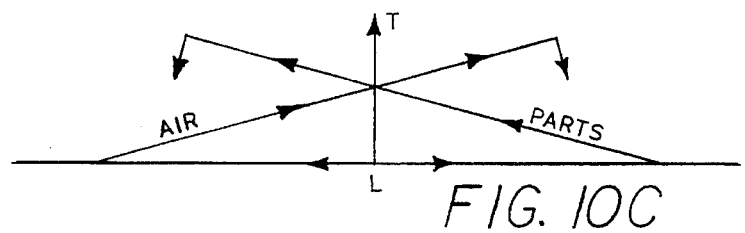
FIG. 10C is a plot of the temperature distributions through the oven for parts and air.

FIGS. 10A, 10B, and 10C illustrate schematically how "roto-retrojet" devices can be used to make more efficient and compact paint curing ovens. The system comprises of a conveyor that conveys parts first through a pre-heat section 50, then a curing oven 51, and finally through a post-cool section 52. The temperature distributions for the parts and air through the system is shown schematically in FIG. 10C. This distribution is obtained by using a set of fans to draw air through the duct in the opposite direction to the flow of parts, but the heat transfer coefficient between parts and air would be so low that the pre-heat and post-cool section would have to be prohibitively long. Roto-retrojets make this energy saving approach feasible. Using a small airflow rate provided by the pumps, retrojets induce turbulence in the main flow enhancing the heat transfer coefficient. The pumps provide an airflow which is small compared to the main airflow.

Figure 11A:
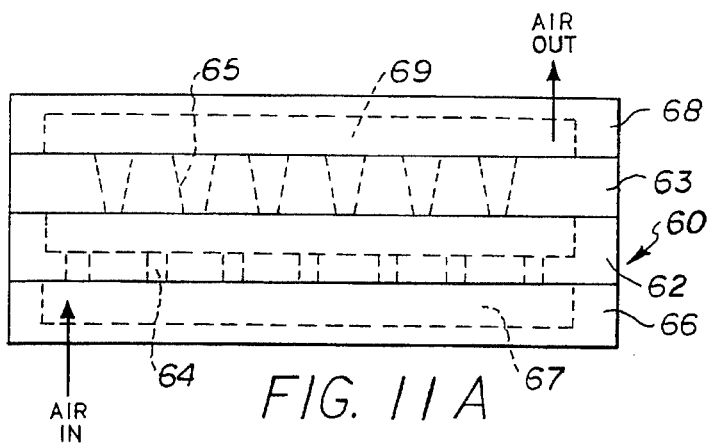
FIGS. 11A, 11B, and 11C are top plan view, elevation, and side view in cross section, respectively, of a retrojet heat transfer device wherein the inlet and outlet jets flow in the same direction.
Figure 11B:
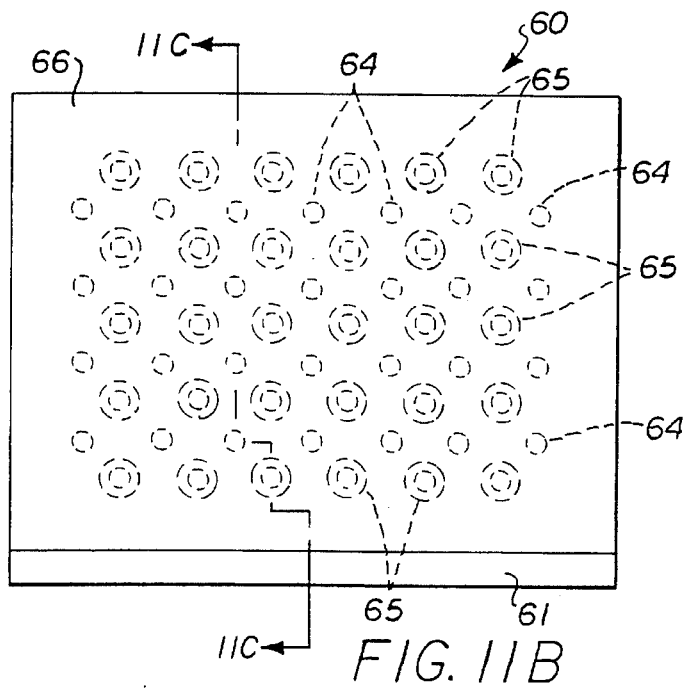
Figure 11C:
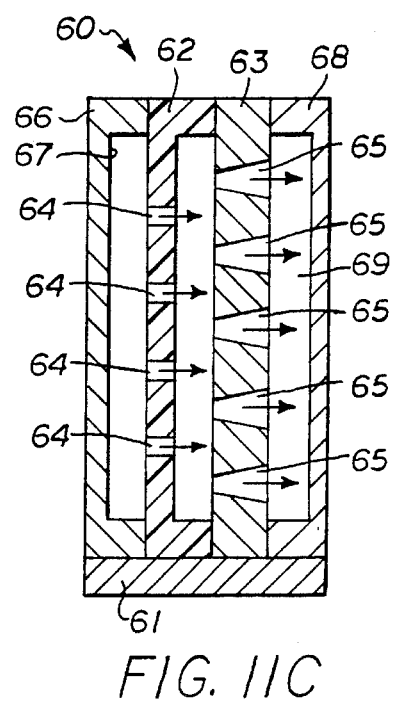

FIGS. 11A, 11B, and 11C illustrate schematically a retrojet apparatus 60 for transferring heat wherein the inlet and outlet jets flow in the same direction. The apparatus 60 utilizes a horizontal bottom plate 61 of metal, a vertical non-metallic plate 62 formed of plastic or other suitable material and a vertical metal plate 63 spaced a predetermined distance parallel to the plate 62. The non-metallic plate 62 has a plurality of adjacent spaced small holes 64 and the metal plate 63 has a plurality of adjacent spaced tapered holes 65 which are axially displaced a predetermined distance from the holes 64 in the non-metallic plate 62. The holes 65 taper from a smaller diameter facing in the direction of the holes 64 to a larger diameter away from the holes 64. An inlet reservoir plate 66 is secured on the outer side of the non-metallic plate 62 and has a recessed fluid inlet reservoir 67. An outlet reservoir plate 68 is secured on the outer side of the metal plate 63 and has a recessed fluid inlet reservoir 69. The reservoir 67 is connected to a fan or pump (not shown).

Air enters the apparatus 60 from the inlet reservoir 67 and is passed through holes 64 breaking it down into small jets. The air impinges the surface of the metal plate and travels along the surface a short distance then passes through the tapered holes 65 in the metal plate 63 which are displaced from the holes 64. The air then enters the outlet reservoir 69 and leaves the apparatus. The metal plate 63 acts as a fin, pulling heat from the bottom plate 61 and transferring it to the air as it passes over the metal plate 63. The tapered holes 65 are provided to recover the dynamic pressure caused by non-metallic plate 62 in creating the jets. This pressure is converted back to static pressure by the tapered holes 65, thus reducing the pressure drop across the apparatus, and hence, reducing the power required to push air through the apparatus.

Figure 12A:
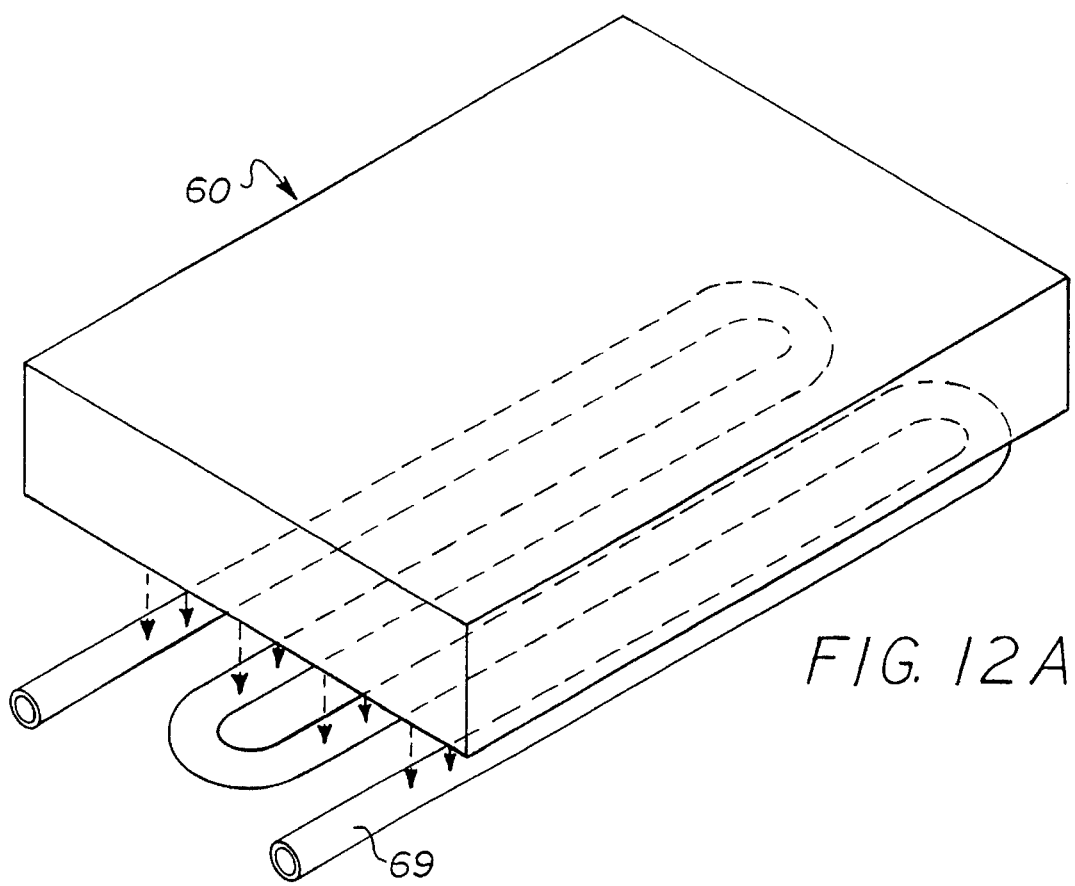
FIG. 12A is an isometric view showing a retrojet device with jets flowing in the same direction and impinging on a serpentine coiled tube containing fluid to be cooled.
Figure 12B:
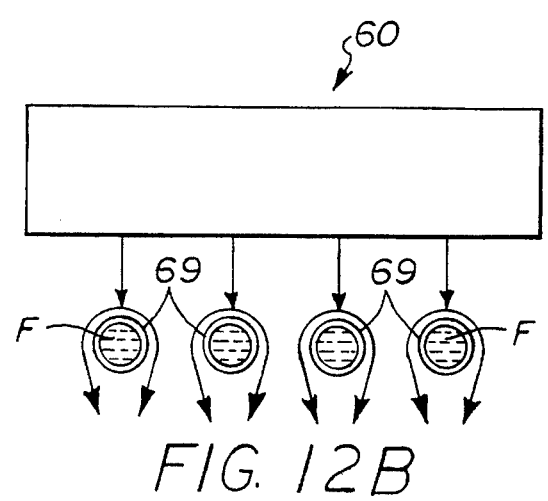
FIG. 12B is an end view of the embodiment of FIG. 12A showing the fluid path over the serpentine coiled tube.

Referring now to FIGS. 12A and 12B, there is shown somewhat schematically, another method of transferring heat using a retrojet apparatus 60, similar to that previously described with reference to FIGS. 11A–11C wherein the inlet and outlet jets flow in the same direction. The apparatus 60 is modified by removing the outlet reservoir plate 68 and allowing the small air jets (arrows) to impinge on a serpentine coiled hollow tube 69. Fluid F to be cooled is pumped through the tube 69.

Air enters the apparatus 60 and is passed through holes breaking it down into small jets, as described previously. The air jets impinge on the surface of the tube 69 and travel along the surface and around the tube surface a short distance then leave the tubular surface. The tube 69 acts as a fin, pulling heat from the fluid circulating through it and transferring the heat to the air as it passes over the tubular surface.

Figure 13E:
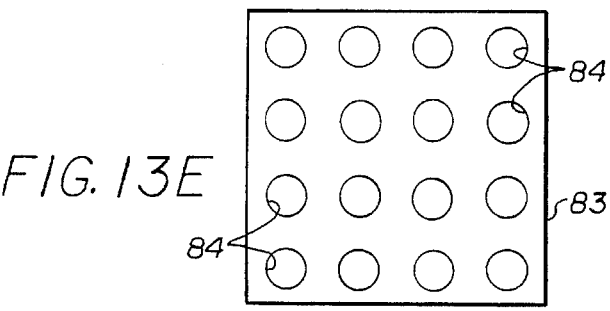
FIG. 13E is a top plan view of a treatment plate option used in the embodiment of FIG. 13A.
Figure 13F:
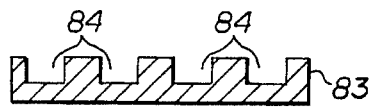
FIG. 13F is a cross section of the treatment plate of FIG. 13E.
Figure 13A:
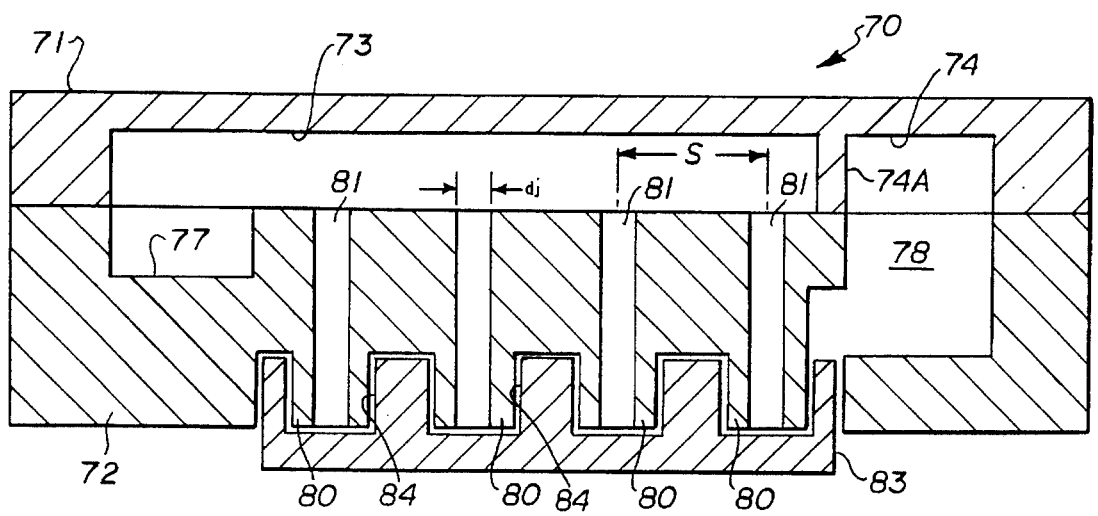
FIG. 13A is a cross section of a modified retrojet device wherein the inlet and outlet passageways are on separate planes rather than on the same plane.
Figure 13B:
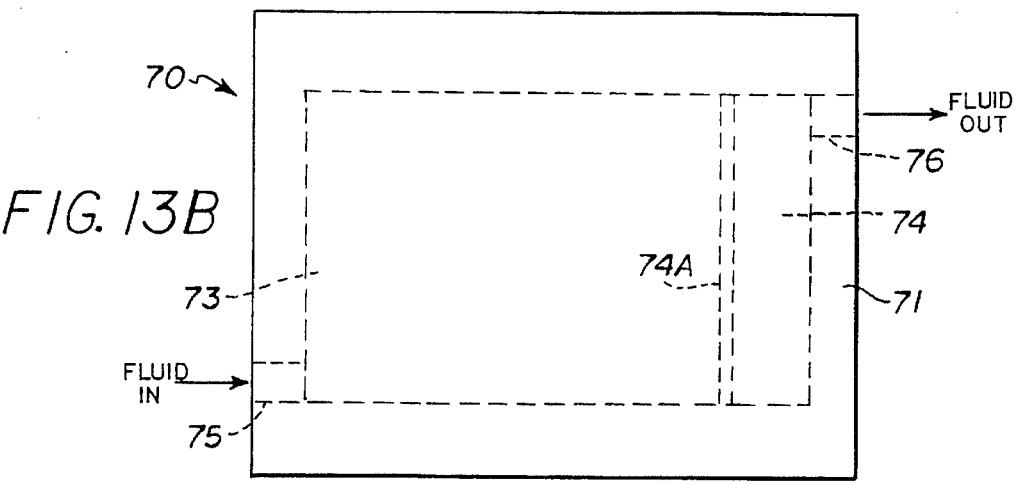
FIG. 13B is a top plan view of the top plate used in the embodiment of FIG. 13A.
Figure 13C:
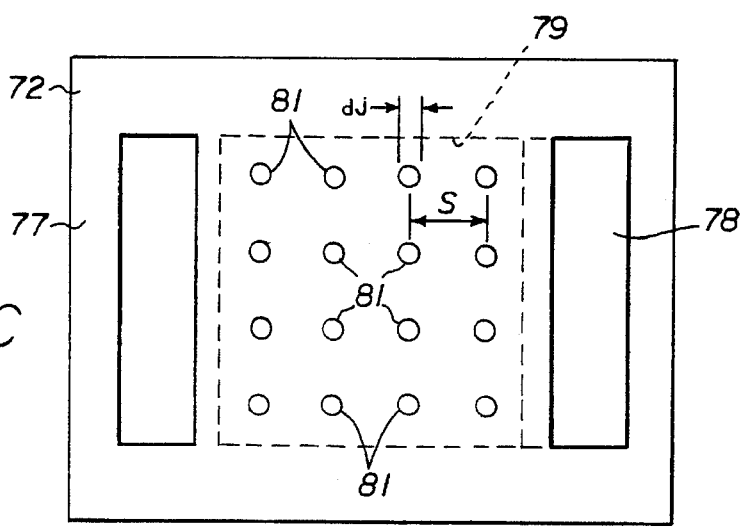
FIG. 13C is a top plan view of the inlet/outlet plate used in the embodiment of FIG. 13A.

FIGS. 13A, 13B and 13C show a modification of the retrojet device wherein the inlet and outlet passageways are on separate planes rather than on the same plane. FIG. 13A shows an assembly of such a device 70 which has top plate 71 and an inlet/outlet plate 72 which are secured together in parallel relation. The top plate 71 is shown from the top in FIG. 13B and the inlet/outlet plate 72 is shown from the top in FIG. 13C and bottom in FIG. 13D. Referring to FIGS. 13A and 13B, the underside of the top plate 71 is recessed to form a generally rectangular fluid inlet reservoir 73 which extends across the plate 71 and terminates near one side, and a separate rectangular fluid outlet reservoir 74 which is laterally spaced from the inlet reservoir defining a wall 74A which separates the reservoirs 73 and 74. A fluid inlet port 75 and a fluid outlet port 76 extend through the side wall of the top plate in fluid communication with the fluid inlet reservoir 73 and fluid outlet reservoir 74, respectively, and are connected to a fluid inlet pump and a fluid outlet pump (not shown) to supply fluid to the inlet reservoir and outlet reservoir.

Figure 13D:
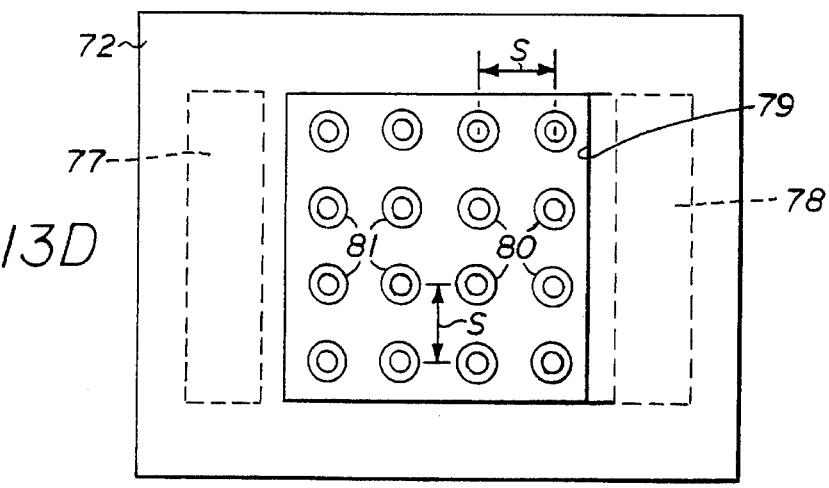
FIG. 13D is a bottom plan view of the inlet/outlet plate used in the embodiment of FIG. 13A.

As seen in FIGS. 13A and 13C, the top surface of the inlet/outlet plate 72 has a generally rectangular recess 77 near one side which forms the bottom of the fluid inlet reservoir 73 and a deeper generally rectangular recess 78 near the opposite side which is in fluid communication with the fluid outlet reservoir 74. As seen in FIGS. 13A and 13D, the bottom surface of plate 72 is provided with a central square or rectangular recess 79 which opens at one side into the deeper recess 78 which extends downwardly from the top surface. A series of adjacent parallel spaced tubular projections 80 are formed on the underside of the inlet/outlet plate 72 within the recess 79.

A plurality of spaced apart inlet orifices 81 extend downwardly from the top surface through each tubular projection 80. Fluid enters into the fluid inlet reservoir 73 and passes through orifices 81 and out through the bottom of the tubular projections 80 forming jets of a diameter $d_j$ which impinge on a treatment surface (not shown) a distance H from the bottom of the inlet/outlet plate 72. The fluid flows across the treatment surface a distance S (distance between the orifices 80) where the interaction between the jets causes the fluid to turn normal to the treatment surface and proceed upwardly between the tubular projections 80 where it is drawn laterally into the outlet reservoir 74 and passes out of the device through outlet port 76.

Another modification is shown in FIG. 13A wherein the treatment surface is replaced by a square or rectangular plate 83. FIG. 13E is a top view of the plate 83 and FIG. 13F is a cross section through the plate. The top surface of the plate 83 has a series of adjacent parallel spaced circular recesses 84 which are slightly larger in diameter than the tubular projections 80 on the underside of the inlet/outlet plate 72. The length and width of the plate 83 is such that it will fit inside of the recess 79 on the underside of the inlet/outlet plate 72. Thus, the tubular projections 80 extend partially into the circular recesses 84. This has the effect of increasing the heat transfer area $A_s$. It also reduces the generation of turbulence and the associated loss in pressure as the fluid turns to enter the outlet passageways.

Figure 14B:
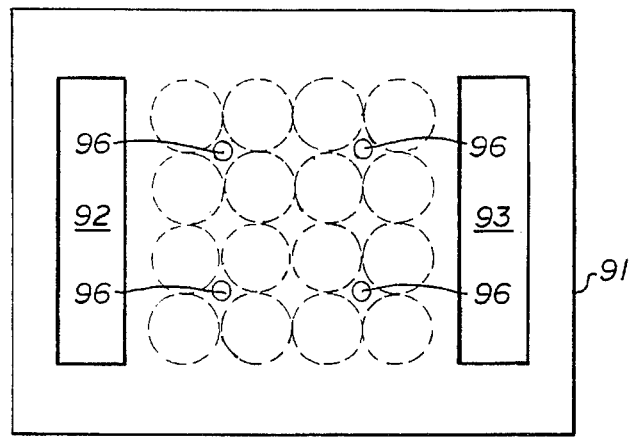
FIG. 14B is a top plan view of the vortex plate.
Figure 14A:
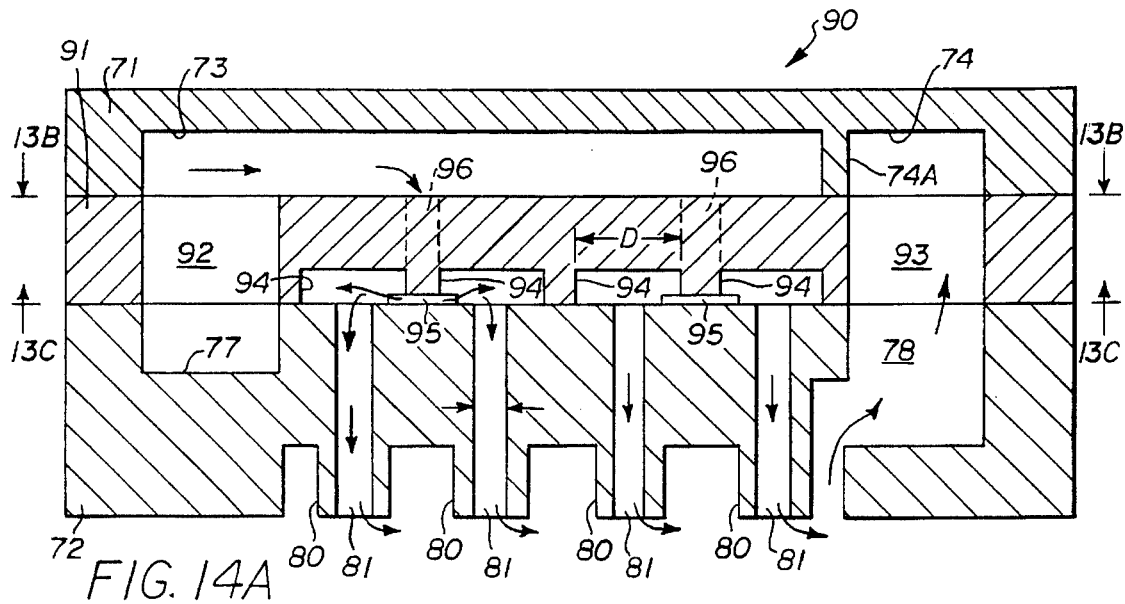
FIG. 14A is cross section of another modification of the retrojet device of utilizing the top plate and inlet/outlet plate of the embodiment of 14A wherein a vortex plate is sandwiched between the top plate and inlet/outlet plate to form a vortex generating, or "roto-retrojet" device.
Figure 14C:
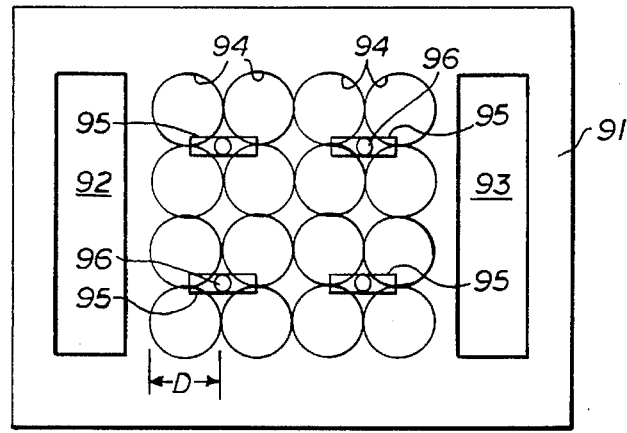
FIG. 14C is a bottom plan view of the vortex plate.

FIGS. 14A, 14B, and 14C show another modification 90 of the retrojet device utilizing the same top plate 71 and inlet/outlet plate 72 described above wherein a vortex plate 91 is sandwiched between the top plate 71 and inlet/outlet plate 72 to form a vortex generating, or "roto-retrojet" device. The top plate and inlet/outlet plate are given the same numerals of reference, but will not be described again to avoid repetition.

The vortex plate 91 is seen from the top in FIG. 14B and from the bottom in FIG. 14C. The vortex plate 91 has a generally rectangular opening 92 and 93 near each side which serve as passageways between the top and bottom of the fluid inlet reservoir 73–77 and the fluid outlet reservoir 74–78. As best seen in FIG. 14C, the bottom surface is provided with a series of adjacent parallel spaced circular recesses 94 having a diameter D between the openings 92 and 93. Each four adjacent circular recesses 94 are joined together by recessed grooves 95. A plurality of spaced apart inlet orifices 96 extend downwardly from the top surface of the vortex plate 91 into each groove 95. The grooves 95 direct the fluid tangentially into the circular recesses 94 such that fluid flows in opposite directions in adjacent recesses 94. The fluid rotates into the outlet orifices 81 in the tubular projections 80. As the fluid rotates into the orifices 81 having a diameter d, the rotational speed increases by the factor D/d so that the emerging jets generally have a high rotational speed much higher than their axial speed. This is a desirable condition when the thrust associated with high axial jet speed cannot be tolerated; for example, cleaning grease from a fragile board using warm water and detergent.

FIG. 15 shows schematically a train 100 being levitated by vertical retrojets 101 emerging from horizontal pipes 102 and returning as a mist to a reservoir 103 below. Simultaneously, retrojets from vertical extensions 104 of the pipe 102 keep the train 100 centered within the track 108. Water leaving the side of the train 100 as a mist flows between the pipes and into the reservoir 103 at the bottom of the track. Water is recycled from the reservoir 103 by a pump (not shown) to re-enter through a valve 105 connected with each U-shaped pipe 106.

FIG. 16A is a top view showing schematically how the train 100 can be propelled forward as retrojets from vertical pipes 104 (FIG. 15) on the side walls of the track 108 strike louvers 107 held at a 45 degree angle to the side of the train. By slanting the louvers 107 in the opposite direction, the train can be decelerated rather than accelerated.

FIG. 16B is an enlerged detail of the louver arrangement of FIG. 16A, showing how the accelerating thrust in manifested by jets from the side walls striking the inclined louver 107. The mechanism for changing the inclination of the louvers is not shown because it is conventional in the art.

FIG. 17 shows schematically how the train (not shown), moving from left to right, while being supported by vertical retrojets, can be maneuvered from an express track 108 onto a local tracl 109, in a transition zone 110, where the thrust of the horizontal jets from the side walls of the express track 108 (FIG. 15) exceed the thrust of the retrojets from the side walls of the local track 109. Once in the local track, the train is centered as usual, until it stops at the station 111, for unloading and loading. It is then accelerated into the transition zone 112, where side walls on the local track 108 provide more thrust than opposing retrojets from the express track 108. This causes the train to drift over into the express track 108, where it proceeds as before. Again, the water recycling equipment is not shown because it is conventional in the art.

PRINCIPLES OF OPERATION

Having described several embodiments of the apparatus, the mathematical equations and principles of operation of the present method of transferring heat, mass, and momentum will be described along with some examples of various applications.

Starting at the leading edge of the surface, a thermal boundary layer is initiated and grows in thickness $\delta_h(x)$ as the distance from the leading edge x increases, according to the relationship:

$$\delta_h(x) = (kx/\Gamma c U)^{0.5} \qquad (eq.\ 1)$$

where $\Gamma$ is the density of the fluid, c is its heat capacity and k is its thermal conductivity and U is the speed of the fluid relative to the plate outside of the boundary layer, in which there are large gradients in the fluid speed. During the same distance, there is a velocity boundary layer that grows to a thickness:

$$\delta(x) \approx (\mu x/\Gamma U)^{0.5} \qquad (eq.\ 2)$$

where $\mu$ is the viscosity of the fluid.
Note that $$\delta_h/\delta = (k/c\mu)^{0.5} = Pr \qquad (eq.\ 3)$$

where Pr is the Prandtl number, which is approximately unity for gases; i.e. the thermal and velocity boundary layers have the same thicknesses for gases, but not necessarily for liquids.

If the temperature difference between the air and surface is $\Delta T_s$, and the heat transfer coefficient is h, then the thermal flux is:

$$Q/A_s = h\Delta T_s = k\Delta T_s/\delta_h \qquad (eq.\ 4)$$

hence, the thermal flux or heat transfer per unit area, decreases with distance because the boundary layer thickness increases with distance. In fact the heat transfer coefficient is a function of distance; i.e.:

$$h(x) = k/\delta_h = (kc\Gamma U/x)^{0.5} \quad \text{(eq. 5)}$$

For gases with $k \approx \mu c$ and $h(x) \approx k/\delta$, then $$h(x) \approx c\,(\mu\,\Gamma\,U/x)^{0.5} \quad \text{(eq. 6)}$$
$$h(x) = 3.94\,(\Gamma\,U/x)^{0.5} \text{ (for air)}$$

Similarly, if the concentration difference of some molecular specie between the surface and the air is n, then the particle flux is $$q_n/A_s = jn = D_f n/\delta_n \quad \text{(eq. 7)}$$

where $D_f$ is the coefficient of diffusion and j is the mass or concentration transfer coefficient, and where the concentration boundary layer thickness is $$\delta n(x) = (D_f x/\Gamma c U)^{0.5} = \delta(D_f/c\mu)^{0.5} \approx \delta \text{(for gases)} \quad \text{(eq. 8)}$$

In other words, for gases, the concentration boundary layer as well as the thermal boundary layer has the same thickness as the laminar velocity boundary layer. Also, the mass or concentration transfer coefficient j and heat transfer coefficient h, through their respective laminar boundary layers, are infinite at the leading edge and decrease with distance like $x^{-0.5}$. At the critical distance x *, the laminar boundary layer becomes turbulent and the boundary layers become thinner, making j and h larger. Mechanical engineers use for design purposes the mean values of j and h over the laminar and the turbulent regimes. These mean values are also affected by the curvature of the surface, so quite often designs are based more on art than science.

Associated with the local values of h and j, there is also a local value of shear stress (shear force per unit area). It is given by:

$$\tau_w(x) = \mu U/\delta(x) = (\mu U^3 \Gamma/x)^{0.5} \quad \text{(eq. 9)}$$

This decreases as $x^{-0.5}$; however, the shear force on the wall per unit width of wall W is $$F/W = \int \tau_w(x)dx = 2(\mu U^3 \Gamma x)^{0.5} \quad \text{(eq. 10)}$$

while the mean value of the heat transfer coefficient over that same distance is $$\begin{aligned}h'(x) &= x^{-1}\int h(x)\,dx \quad \text{(eq. 11)}\\ &= 2\,(k\,c\,\Gamma\,U/x)^{0.5}\\ &= 2\,h(x)\end{aligned}$$

Similarly, $$j'(x) = 2j(x) \quad \text{(eq. 12)}$$

A conclusion was made that the longer the fluid is in contact with the surface, the smaller the mean heat and mass transfer coefficient, while the wall friction force steadily increases, and so does the power required to overcome this force.

Now, relating this theory to the retrojet device shown in FIG. 1A, from geometric considerations $$x \approx S(0.71 - d/S) \quad \text{(eq. 13)}$$

It was shown both theoretically and experimentally that the jets merge; i.e.

$$d \approx S \text{ (at the height } H \approx H^* \approx 5.7\,S) \quad \text{(eq. 14)}$$

It has also been shown that the speed of the jets at this critical height is $$u^* \approx 0.03\,u_j \quad \text{(eq. 15)}$$

After merging, the forward velocity of the jets persist for an additional height $$H^{**} \approx 28.5\,S \quad \text{(eq. 16)}$$

If there is a treatment surface located at a height above the retrojet surface H<H* where the diameter of the jet is d<S, then the fluid runs across the treatment surface for a distance $$x \approx S(0.71 - d/S) \quad \text{(eq. 17)}$$

before forming outlet jets—RJ. In this mathematical model the diameter and speed of the jets at height H is given by $$u/u_j \approx (d/d)^2 \approx (1 + 0.1 H/d_j)^{-2} \quad \text{(eq. 18)}$$

It was shown from first principles that the heat transfer coefficient for laminar flow of air over the surface for a distance x is given by equation 6.

Figure 18:
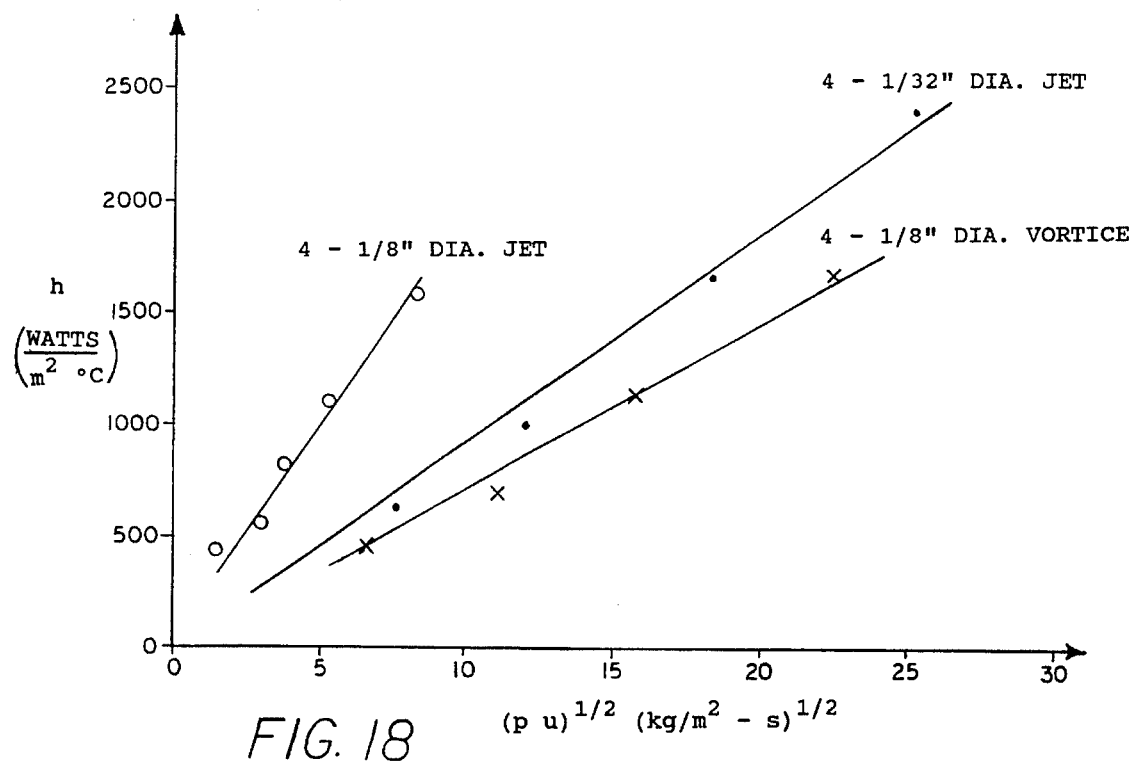
FIG. 18 is a graph showing heat capacity versus the density and air speed of jets of various diameter.

To verify this derivation, a piece of aluminum of mass M and heat capacity C was heated to 100° C. and the time constant τ, was determined for the exponential decay in temperature as it was cooled by retrojets. The heat capacity was determined by the relationship $$h \approx MC/A_s \tau \quad \text{(eq. 19)}$$

where $A_s$ is the area exposed to the retrojets. The density of the air in the jets Γ and their speed u was also measured. h versus $(\Gamma u)^{0.5}$ was plotted (FIG. 18). This was done for three configurations, each having four inlet holes at the corners of a square ¼"×¼" and a single outlet hole at the center of the square. The treatment surface was ⅛' above the retrojet surface, and the area of the treatment was ½"×½". The small hole array has inlet holes of diameter ¹⁄₃₂", the large hole array had inlet holes ⅛"d and the vortex array also had inlet holes ⅛"d, but these were fed tangentially by slots ¹⁄₃₂"× ¹⁄₃₂". Note that the data points lie on straight lines through the origin as predicted by theory, and the slopes of these lines determine the value of x, which agrees fairly well with a geometrically predicted value given by equation 13.

Figure 19:
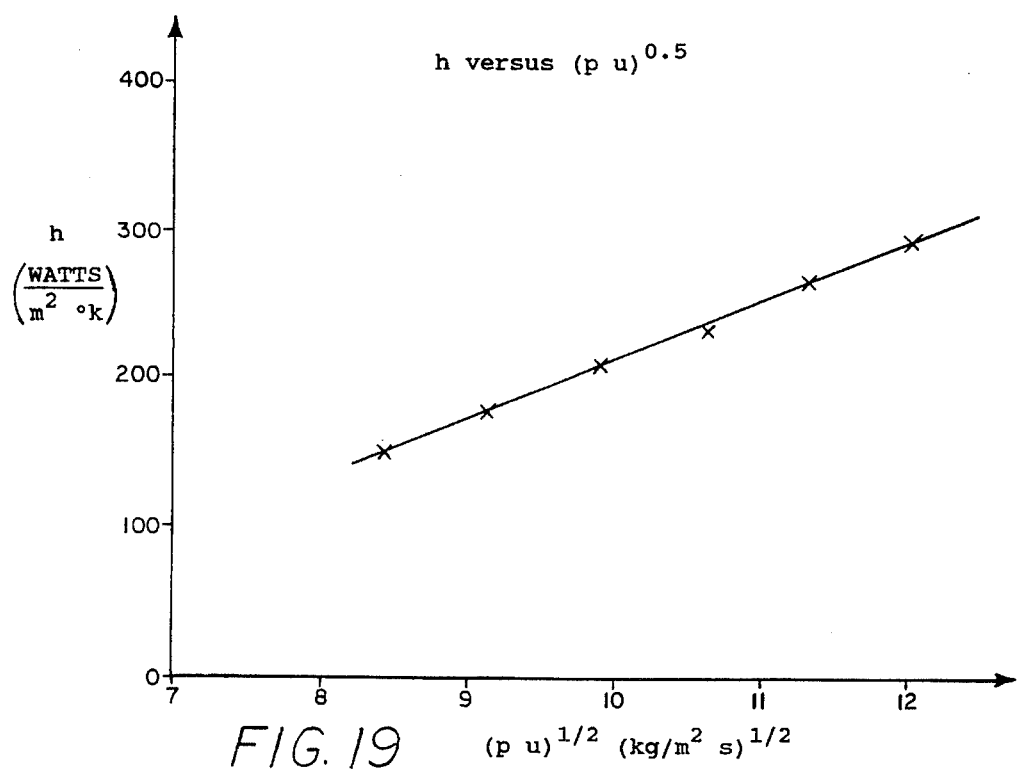
FIG. 19 is a graph showing heat capacity versus the density and air speed of jets similar to FIG. 15 using a larger array of smaller holes.
Figure 20:
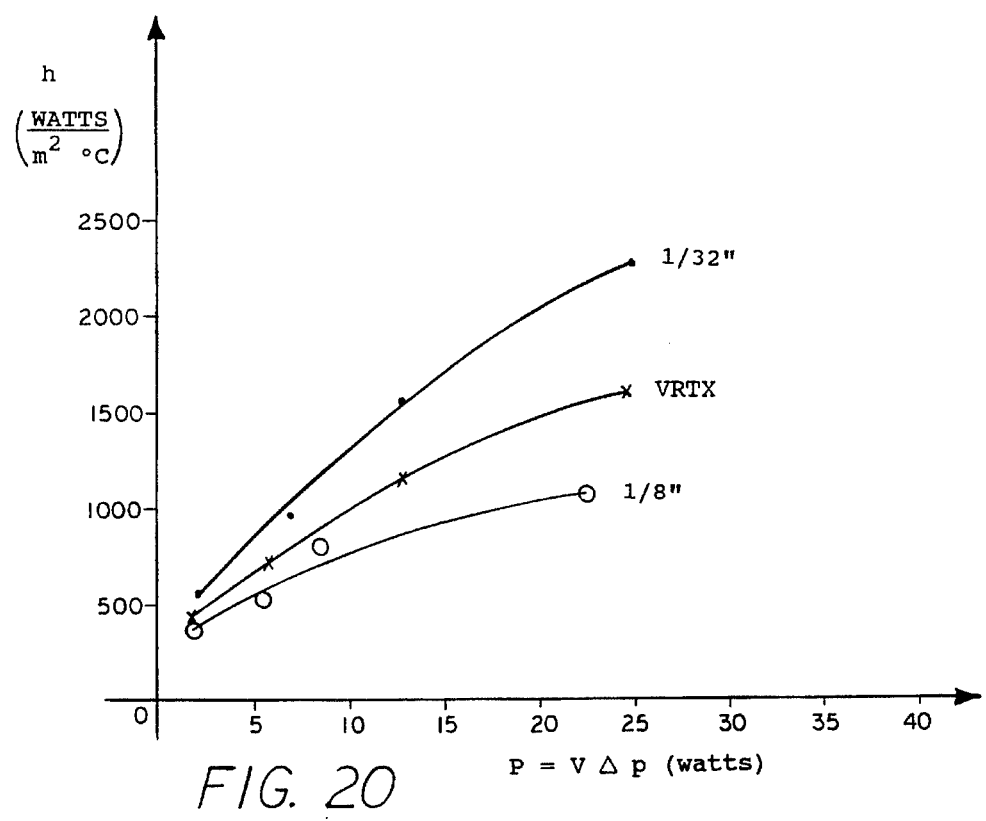
FIG. 20 is graph showing the performance of three small arrays of jets with equal power input.

This experiment was repeated with a much larger array of ¹⁄₃₂" diameter holes on ½" centers; i.e. 8×8=64 inlet holes. The results were in even better agreement with theory (FIG. 19). The performance of the three small arrays with equal power input was also compared; P=V Δp where V=u A is the volumetric flow rate of the jets, and Δp is the pressure drop across the device. The results are given in the plot of h versus P (FIG. 20), and it shows that it takes less power to achieve a desired heat transfer coefficient with the array of small holes than with an array of large holes. This too agrees with theoretical predictions.

Some temperature maintenance experiments were done, in which a plate of metal received heat from one side at rate Q, and this heat was removed at the same rate by retrojets having mass flow rate m, inlet temperature $T_i$ and outlet temperature $T_o$. The energy balance equation for these experiments is $$Q=mc(T_o-T_i)=hA_s[T_s-(T_i+T_o)/2] \qquad \text{(eq. 20)}$$

The efficiency of this heat transfer process is defined such that it is unity when the air emerges at the same temperature as the plate; i.e.

$$\eta = (T_o-T_i)/(T_s-T_i) \qquad \text{(eq. 21)}$$
$$= (m\,c/h\,A_s+1/2)^{-1}$$

Using the large array described above, an experiment was performed in which measurements of $T_i$, $T_o$ and $T_s$ were obtained to determine $\eta$. The mass flow rate was measured and heat transfer coefficient was calculated from equation 19.

Figure 21:
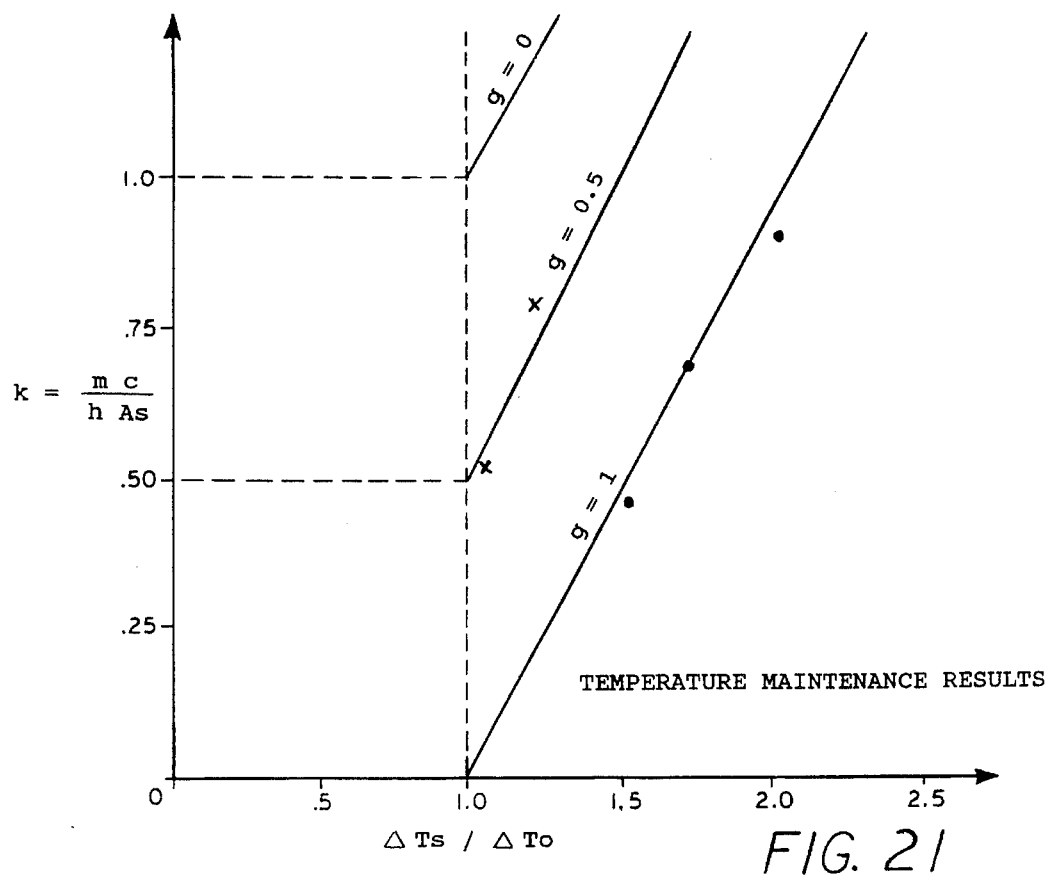
FIG. 21 is a graph showing mass flow rate of a large jet array versus change in temperature between the inlet and outlet temperature of the jets.

The parameter $m\,c/h\,A_s$ was determined, and plotted as a function of $\eta^{-1}$ in FIG. 21. Again, the agreement between theory and experiments is quite good.

To appreciate the significance of this technique, consider using the same mass flow rate of air flowing down a copper tube of the same cross sectional area A as the jets, so the flow speed down the tube is the same as the jets. How much surface area $A_s'$ will this tube require in order to achieve the same efficiency as the retrojet device achieved with area $A_s$? Also, what are the relative pressure drop and fan power?

To answer these questions, the differential equation must first be solved describing the rate at which the temperature of the gas increases as it proceeds down the tube; i.e.

$$d(mcT)/dx=h'\pi D(T_s-T) \qquad \text{(eq. 22)}$$

where D is the diameter of the tube. The efficiency of this process is found by integration to be $$\eta' = (T(L)-T_i)/(T_s-T_i) \qquad \text{(eq. 23)}$$
$$= 1-\exp(-h'\pi\,D\,L/m\,c)$$
$$= 1-\exp(-(h\,A_s/m\,c)(h'\,A_s'/h\,A_s))$$

The retrojet device can achieve $\eta \approx 1$ by making $h\,A_s/m\,c \approx 2$. In order for the tubular heat exchanger to have $\eta' \approx 1$, the exponent must have at least the value $5 \approx 2$ ($h'\,A_s'/h\,A_s$); therefore, the surface area ratio must be greater than $$A_s'/A_s \approx 2.5\,h/h' \qquad \text{(eq. 24)}$$

The heat transfer coefficient for fully developed turbulent pipe flow is given in engineering handbooks by the empirical formula $$h' \approx 2.77(\Gamma u)^{0.8}/D^{0.2} \qquad \text{(eq. 25)}$$

with $D=\frac{1}{4}$", this is equivalent to the retrojet device with 64 holes $\frac{1}{32}$"d. And, if jet speed $u \approx 10$ m/s was chosen, then $h' \approx 59.4$ watts/m$^2$-°C. and using the derived formula for retrojets $h \approx 3.94\,(\Gamma u/x)^{0.5}=3.94\,(1.3 \times 10/8 \times 10^{-3})^{0.5} \approx 159$ watt/m$^2$-°C. Therefore, $A_s'/A_s \approx 7.09$.

The ratio of fan powers and pressure drops is given by $$P'/P = \Delta p'/\Delta p \qquad \text{(eq. 26)}$$
$$= C_d'/C_d = (C_f'4\,L/D)/1$$

where the wall friction coefficient in the tube is $C_f \approx 0.03$ and the aspect ratio is given by relationship $$4\,L/D = A_s'/A = (A_s'/A_s)(A_s/A) \qquad \text{(eq. 27)}$$
$$= (A_s'/A_s)(S/D_j)^2\,(4/\pi)$$
$$= 7.09\,(16)^2(4/\pi) \approx 2310$$

Hence, the fan power ratio is $P'/P=69.4$ and the aspect ratio is $L/D \approx 578$, so $L \approx 145$ inches. The volume of this tubing, assuming a very thin wall is approximately 7.10 in$^3$, not including he space that is normally wasted by folding the tubing back and forth. On the other hand, the plastic of the retrojet device need not be more than $\frac{1}{8}$" thick, including a thin metal heat transfer surface of area $4" \times 4"=16$ in$^2$ located just $\frac{1}{32}$" above the retrojet surface. The volume of this device is 2.0 in$^3$. Since the plastic parts can be molded and glued together very inexpensively, the retrojet device is a lot less expensive than tubular heat exchangers, or fin-tubing heat exchangers.

Another perspective can be given by considering the advantage of using the retrojet device over the conventional methods used in surface cooling flow of a fluid over a flat surface.

The mathematical model describing the pressure drop due to friction on the treatment surface and the retrojet surface as the jet spreads from the inlet hole and flows towards four outlet holes is given by $$\Delta p \approx 2(\mu\,U/\delta)(S^2/A_j) \approx 2\,(\mu\,U/\delta)(A_s/A)$$
$$\approx 2\,(\Gamma\,\mu/x)0.5\,U^{1.5}\,(A_s/A).$$

Using $h=c\,((\Gamma\mu u)/x)^{0.5}$, $$\Delta p \approx 2(x/\Gamma\mu)\,(h/c)3(A_s/A),$$

the pump power $P=UA\Delta p=2(x/\Gamma\mu)^2(h/c)^5 A_s$,

Thus, to achieve the same heat transfer coefficient in the retrojet and the conventional device, the pressure drop in the device is proportional to $x/A$, and pump power is proportional to $x^2$ as $A_s$ is assumed to be the same. If the jet diameter is $d=\frac{1}{32}$", $S=\frac{1}{4}$", and we have 64 jets, the ratio of pressure drops $\Delta p/\Delta p'=0.045$ and ratio of power required $P/P'=0.005$ in the favor of the retrojet device.

Referring now to the efficient coal combuster of FIG. 4; at equilibrium, the temperature of the coal and molten slag is $T_s$, the temperature of the inlet air is $T_i$ and the temperature of the outlet combustion gas is $T_o$, and we have shown from the energy balance equation that these are related by the expression for heat transfer efficiency; i.e.

$$\eta = (T_o-T_i)/(T_s-T_i) \qquad \text{(eq. 28)}$$
$$= (m\,c/h\,A_s+0.5)^{-1}$$

Where m is the mass flow rate of air, c is its heat capacity, h is the heat transfer coefficient and $A_s$ is the surface area of the coal. To achieve $\eta \approx 1$ and $T_o \approx T_s$, we need $$0.5 \approx m\,c/h\,A_s \qquad \text{(eq. 29)}$$
$$\approx 0.25\,c\,(m/A_s)^{0.5}\,(A\,x/A_s)^{0.5}$$

where A is the area of the inlet jets and x is the distance that the jets are in contact with the cold surface; i.e.:

$$A\,x/A_s = (\pi/4)\,(d_j/S)^2\,S\,(0.71-d_j/S) \qquad \text{(eq. 30)}$$
$$\approx 5.50 \times 10^{-3}\,S$$

where $d_j/S \approx 0.10$ was arbitrarily chosen.

If $S \approx 10^{-2}$ is arbitrarily chosen, so that $d_j \approx 10^{-3}$ m; then with $\mu \approx 1.55 \times 10^{-5}$ kg/m-s, the required surface area is $A_s \approx 0.142 \text{ m}^2.$ (eq. 31)

Now consider a small combustor burning coal at the rate $M \approx 10^{-3}$ kg/s having heat of combustion of $Q' \approx 10^7$ joules/kg, then the thermal power generated is $Q = MQ' = mc(T_o - T_i) = 10^4$ watts. (eq. 32)

For temperature rise of $T_o - T_i = 10^3$ °C., with $c \approx 10^3$ joule/kg-°C., the air flow rate must be $m \approx 10^{-2}$ kg/s, and the required coal surface area is $A_s \approx 0.14$ m$^2$, or 0.37 m×0.37 m.

The total area of the inlet jets is $A = A_s (\pi d_j^2/4)/S^2 \approx 1.10 \times 10^{-3}$ m$^2$; therefore, with air at normal density $\Gamma \approx 1.3$ kg/m$^3$, the speed of the jets is $u \approx m/\Gamma A \approx 7.00$ m/s. This is low enough not to substantially disturb the coal surface, or to cause a significant pressure drop across the retrojet device. Since the thickness of the retrojet device and the space above the coal can be as little as 2 $S \approx 2 \times 10^{-2}$ m, and the thickness of the coal and the slag need not be any greater than this, the active volume of the device can be as small as 4 S $A_s \approx 5.6 \times 10^{-3}$ m$^3$, where the power density will then be $1.89 \times 10^6$ watts/m$^3$.

If, on the other hand, this combustor was operated at 10 times normal density and pressure, but with the same jet speed; then, the area of the jets could be reduced by a factor of 10, and with $(d_j/S)^2 = A/A_s$, $A_s$ can be reduced by a factor of 10. This in turn would increase the power density by a factor of 10 to $1.89 \times 10^7$ watts/m$^3$.

Also note that the rate of burning coal and generating power can be increased proportionately to the surface area of the coal $A_s$ at any given operating pressure. The thickness of the device need not be changed. This device was meant to be illustrative and is by no means the optimum design.

A problem inherent to all high temperature combustors is the formation of nitrogen oxides, because there are usually regions where the temperature is high, and there is plenty of oxygen, but very little fuel; therefore, nitrogen reacts with the oxygen molecules. Since the inlet air is 80% nitrogen and 20% oxygen, we must arrange for all of the oxygen to be consumed before the combustion gas leaves the cold surface, then nitrogen oxides will not form, regardless of the outlet temperature. Let $n_i$ be the inlet concentration of oxygen and $n_o$ be the outlet concentration of oxygen, with $n_s \approx 0$ being the surface concentration of oxygen because the reaction rate with coal at the surface is so high; then, the efficiency of this mass transfer process by analogy with the heat transfer process is $$\begin{aligned}\eta &= (n_i - n_o)/(n_i - n_s) \\ &\approx (u A/j A_s + 0.5)^{-1} \\ &\approx (m c/h A_s + 0.5)^{-1}\end{aligned}$$ (eq. 33)

where j=h/c is the mass or particle transfer coefficient. Hence, with the design described above, $\eta \approx 1$ and $n_o \approx n_s \approx 0$ i.e. all of the oxygen is consumed on the surface of the hot coal, forming carbon dioxide but no nitrogen oxides.

Let $n'_i \approx 0$ be the concentration of carbon dioxide in the inlet air and the $n'_o$ be the concentration of carbon dioxide in the outlet combustion gas, with $n'_s$ the concentration of carbon dioxide on the surface of the coal. Again, the efficiency of this process is very high; i.e. $\eta \approx (n'_o - n'_i)/(n'_s - n'_i) \approx 1$; therefore, with $n'_i \approx 0$, $n'_o \approx n'_s$. Thus there would be a high concentration of carbon dioxide in the exhaust, because there is a high concentration of it on the surface of the coal.

This is also true of sulfur dioxide, if there is an appreciable amount of sulfur in the coal. To suppress the emission of this pollutant, we will add calcium carbonate or calcium hydroxide to the pulverized coal, and this will convert any sulfur dioxide formed on the surface of the coal to calcium sulfide or calcium sulfate which are molten at this temperature. Hence, this salt will stick to the coal and eventually become part of the slag.

At start up, some gaseous or liquid fuel will be injected through the retrojet device that will be ignited and burned until the slag becomes molten, then the fuel will be shut off, and coal will be dropped on to the molten slag. The slag will be removed continuously, or periodically to maintain the proper level.

This type of combustor can provide the same benefits when burning liquid fuel instead of coal. Since there will be no slag, a thin film of oil will be maintained at the bottom of the device, and fuel will be burned on its surface.

Referring again to the retrojet device of FIG. 1A, several examples of the possible uses will be described.

The retrojet apparatus has been found to be effective in surface cleaning applications, for example removing grease or oil from circuit boards. A retrojet device, similar to that shown in FIGS. 1A and 1B will produce adjacent jets which, when striking a surface to be cleaned, will constructively interfere with each other in a square pattern. However, the fluid (water) after bouncing off the surface to be cleaned, returns back to the device. This prevents accumulation of the fluid anywhere between the retrojet device and the surface being cleaned, thereby allowing the momentum of the jets to persist for very large distances. In removing grease, the fine jets of water penetrate the layer of grease, then displace it radially outward as it expands along the surface, ripping and tearing the film from the surface so that it is carried away films of water leaving the surface between the striking jets.

For heating or melting applications, a heater can be added to the inlet line, and the hot inlet jets can be used to heat the treatment surface. For example, to melt ice on wind shields, and ice on sidewalks.

The retrojet device can be used in rapid drying applications if the treatment surface is a damp fabric.

In chemical treatment applications, the treatment surface can be coated with chemicals injected in the inlet line by suitable means; for example, dyes, pigment, vaporized metal, etc. If it is desirable to exclude air from the process, then the periphery could be closed, and any other suitable carrier fluid could be used; e.g., nitrogen, argon.

In efficient combustion applications, liquid or gaseous fuels can be injected in the inlet line, or into the inlet jets by means of a perforated plate over the retrojet surface that allows the fuel to mix with the inlet jets, but not with the outlet jets. If the two plates are metal, voltage can be applied between the two plate to ignite the fuel emission from the jets, thereby creating a flame holder whose flames would very efficiently transfer heat to any treatment surface nearby.

The retrojet device can be used for levitating surfaces by creating an upward thrust on any treatment surface placed above the retrojet surface, i.e.;

$F = 2 mu$ (eq. 35)

where m is the total mass flow rate of the jets, and u is their speed when they strike the treatment surface. The factor 2 is used because the outlet jets leaving the treatment surface develop thrust equal to the inlet jets striking the surface. The upward thrust decreases with height because u decreases with height. By connecting the inlet and outlet lines of FIG. 1A, and using a single fluid pump, the treatment surface can be levitated and its height above the retrojet surface can be adjusted by adjusting the jet speed. Since there is no net friction force on the levitated surface, it can be moved freely in a horizontal direction.

The retrojet device as shown in FIG. 1A experiences a downward thrust F. If it was submerged in water and the inlet and outlet lines were connected to include a single water pump, the device could be used to overcome the buoyancy force and submerge deeper. Similarly, if the device were upside down and in air, the thrust could make the device hover or propel it upward, provided that the thrust is greater than the weight of the device and the pump.

The retrojet device of FIG. 1A can be used to reduce drag by destroying the normal viscous boundary layer existing on a surface when air flows parallel to it with speed U. This boundary layer would be replaced by a retrojet boundary layer having no net friction force or skin heating due to the rate of working of this friction force. Hence, retrojets properly distributed over the surface of a body can reduce its skin drag and the power required to propel it through a fluid. This can only be accomplished if the momentum of a row of jets is equal to or greater than the momentum of the flow in the viscous boundary layer that would cross that row of jets; i.e.;

$$u_j(u_j d_j) \approx (U/2)(U\delta/2) \qquad \text{(eq. 36)}$$

where $\delta$ is the thickness of the boundary layer that would exist if there were no retrojets, and this can be written in terms of the friction coefficient $C_f$;

$$\delta \approx 2\mu/\Gamma U C_f \qquad \text{(eq. 37)}$$

For convenience in this application, it is assumed that the inlet and outlet jets are formed by slots in the surface of width $d_j$ and distance between centers S, and that these slots run perpendicular to the direction of flow.

The required ratio of jet speed to flow speed is therefore $$u_j/U \approx (\delta/4 d_j)^{1/2} \approx (\mu/2 \Gamma U d_j C_f)^{1/2} \qquad \text{(eq. 38)}$$
$$\approx (2 C_f Re)^{-1/2}$$

where Re is the Reynold's number based on $d_j$.

This application of retrojets is meritorious only if the power required to drive the retrojet is small compared to the power required to overcome the friction force that would exist without retrojets; in other words, the figure of Merit Z must be much less than unity; i.e.;

$$Z = (d_j S u_j^3/2)/(S^2 C_f U^3/2) \qquad \text{(eq. 39)}$$
$$\approx (d_j/S) C_f^{-2.5} (2 Re)^{-1.5}$$

As an example, consider a missile moving with $U \approx 10^3$ m/s through air with density $\Gamma \approx 0.1$ kg/m$^3$ and viscosity $\mu \approx 10^{-5}$ kg/m-s; then if the width of the slot is $d_j \approx 10^{-3}$ m and the distance between centers of inlet slots is $S \approx 10^{-2}$ m, then the Reynold's number based on slot width is $Re \approx 10^4$, and since the friction coefficient is $C_f \approx 10^{-2}$, the figure of merit is $Z \approx 3.54 \times 10^{-3}$.

Now consider the example of a boat moving through water with speed 10 m/s where the density is $10^3$ kg/m$^3$ and the viscosity is $50 \times 10^{-5}$ kg/m-s, and we make $d_j \approx 5 \times 10^{-3}$ m and $S \approx 5 \times 10^{-2}$ m, then the Reynold's number based on slot width is $10^5$; therefore with a friction coefficient $C_f \approx 10^{-2}$, $Z \approx 1.12 \times 10^{-4}$.

Finally, consider an automobile with speed 30 m/s through air with density 1 kg/m$^3$ and viscosity $10^{-5}$ kg/m-s; then, with $d_j \approx 10^{-3}$ m and $S \approx 10^{-2}$ m, $Re \approx 3 \times 10^3$. At this low Reynold's number, $C_f \approx 10^{-1}$; therefore, $Z \approx 6.80 \times 10^{-6}$.

A conclusion was made that this technique for eliminating skin friction applies for aircrafts, boats and automobiles. However, it should not be forgotten that the drag force on moving vehicles consist of three parts; wave drag, form drag, and skin drag. This technique only reduces the latter. However, if the inlet and outlet jets are inclined at an angle e to the direction of motion of the fluid over the vehicle, then there is a net thrust per unit area of surface in the direction of motion given by $$F/A_s = 2 (u_j^2 A_j/S^2) \cos\Theta \qquad \text{(eq. 40)}$$
$$= 2 (u_j^2 d_j/S) \cos\Theta$$

Thus, by increasing $u_j$ sufficiently, it is possible to overcome wave drag and form drag as well as eliminating skin drag. Thus, a slender body with surface area large compared to cross sectional area could be propelled through air or water by this technique.

This technique for eliminating skin drag and skin friction is particularly useful for increasing the life of turbine blades that operate in high temperature corrosive gases. By replacing the normal boundary layer with a retrojet boundary layer of clean cool air, the blades life time can be greatly extended. Furthermore, the aero dynamic distribution of pressure over the blade surface would be unchanged.

Submicron and supermicron size particles of liquid or powder can be delivered by the inlet jets to a treatment surface by the centrifugal force exerted on the particles as the fluid turns at speed u in the small radius $r \approx S/2$. The particle of radius a and density $\Gamma$ has mass $m \approx \Gamma(4/3)\pi a^3$, and the centrifugal force on this particle is approximately $m u^2/r$ which is balanced by the Stoke's drag force $6\pi\mu a w$ as it drifts towards the treatment surface with speed w; i.e.

$$w \approx (2/9)\Gamma a^2 u^2/(\mu(S/2)) \qquad \text{(eq. 41)}$$

It can be shown that the efficiency of collecting particles in this process is $$\eta \approx 1 - \exp(-w S^2/(\pi d^2/4)) \qquad \text{(eq. 42)}$$
$$= 1 - \exp[-(16/9 \pi) (\Gamma S/\mu) (a u/d)^2]$$

Consider for example an array with $S \approx 10^{-2}$ m, $d \approx 10^{-3}$ m, $u \approx 10$ m/s attempting to precipitate particles of radius $a \approx 10^{-6}$ m (1 micron) having density $\Gamma \approx 10^3$ kg/m$^3$ out of air having viscosity $\mu \approx 10^{-5}$ kg/m-s; in this case, the exponent is 8.49 and $\eta \approx 1.0$. This means that all supermicron size particles would be captured. Submicron size particles would behave like large molecules and diffuse to the wall and remain there, provided that the wall has some means to prevent back-diffusion. In other words, the surface would have to be adhesive in some ways. In this case, by analogy with the diffusion of heat, $$\eta \approx u A/j A_s + 0.5)^{-1} \qquad \text{(eq. 43)}$$
$$= (m c/h A_s + 0.5)^{-1}$$

because for air, mass transfer coefficient is $j \approx h/c$.

The treatment surfaces are automatically adhesive if the particles being collected are liquid, or a mixture of powder and liquid. The surface can easily be made adhesive by having it precoated with small amount of liquid, or by electrically charging the particles and using an electrostatic holding force, which will be described below.

In distillation processes, a mixture of two liquids having a large difference in boiling points can be sent through the inlet jets with the temperature of the surface on which they impinge set so that the liquid with the lowest boiling point will evaporate on impingement and the vapor can be collected.

VOCs, such as toluene, TCE, etc. in the air can be condensed by impinging the air on the surface which has a temperature equal to the melting point of the VOC.

Because of the retrojet device's ability to efficiently transfer heat and mass, it is possible to dry carpets which have been steam cleaned very efficiently. By transferring heat to the wet carpet efficiently, the water will evaporate and can be removed from the carpet in to the air and taken away by the retrojet device.

There are certain applications where it is advantageous to have adjacent inlet jets rotating in opposite directions so they roll upon one another without friction as the fluid moves forward, as described in FIGS. 9A and 14A. These counter-rotating vortices, or "roto-retrojets" persist for many diameters downstream when the array is large. Several important uses for the roto-retrojet flow field are described below.

When the treatment surface is irregular, the distance from a retrojet surface varies, and there may be deep recesses where $h>h^*$. In these recesses, there is stagnant fluid and very slow heat/mass transfer. Roto-retrojets can penetrate into these deep recesses transferring heat/mass even between elements of the surface that may be parallel to the axis of the jets. In other words, roto-retrojets persist for distances far beyond that at which they merge ($h=h^*$), because they roll upon one another without friction as they move forward.

Some surfaces are delicate, or have a delicate coating that would be destroyed if subjected to the high forward thrust of the retrojets. Roto-retrojets, on the other hand, store most of their momentum in the rotational degree of freedom, generally parallel to the treatment surface; therefore, heat/mass transfer can be accomplished without substantially disturbing the surface. A good example is curing liquid or powder paint on solid surfaces. The high momentum of retrojets could disturb the paint while transferring heat to it at the substrate below, but the roto-retrojet would not; furthermore, there could be a larger distance between the treatment surface and the retrojet surface.

Roto-retrojets are also very effective when transferring heat/mass to fibers, many of which are aligned parallel to the axis of the roto-retrojet; for example, drying hair.

Conventional ovens without inlet and outlet heat exchangers, typically burn oil or gas, then inject at high speed the hot combustion gas. Only about 5% of the thermal energy in this combustion gas goes into the parts, the rest goes up the stack into the environment causing pollution while wasting 95% of the fuel energy. After the heat in the parts cures the paint on the surface, this heat must be removed by air or water, with considerable additional cost for blowers and ducts. On the other hand, the present system will return at least 80% of the thermal energy leaving the oven to the parts and in the air back to the oven using two heat exchangers. Thus, we need only feed into the oven 20% of the thermal energy required by the parts for the curing process, or 20%×5%=1% of the fuel energy now pumped into conventional ovens. This power requirement is so small that it can be done cleanly with electrical heaters in the oven rather than using a dirty inefficient combustion process. In addition, the flow rate of air through the proposed system is typically 30 to 50 times less than the flow of combustion gas. Hence, when curing liquid paints, it is a lot more expensive to destroy or recover solvent vapor from a much larger volume of much hotter exhaust combustion gas, than from a much smaller volume of cooler exhaust air from the proposed system.

These examples of applications are not meant to be exclusive, but merely illustrative of the versatility of the present approach to heat, mass, and momentum transfer using multijets, retrojets, and roto-retrojets. Some practical applications have been described that cannot be accomplished by conventional heat transfer techniques, and other applications have been described wherein the present method has distinct advantages, including increasing efficiency while reducing size and cost.

While this invention has been described fully and completely with special emphasis upon a preferred embodiment, it should be understood that within the scope of the appended claims the invention may be practiced otherwise than as specifically described herein.

I claim:

1. A method for transferring heat, mass, and momentum between a target surface and at least one fluid using a multiplicity of tiny fluid jets comprising the steps of;

providing at least one plate having a first plurality of adjacent closely spaced outlet perforations extending to an exterior surface and interconnected by at least one fluid supply channel to cause fluid passing therethrough to be discharged as a series of small separate outlet jets and a second plurality of adjacent closely spaced return perforations extending to an exterior surface and interconnected by at least one fluid return channel to draw fluid therethrough as a series of small separate return jets, introducing a fluid at a predetermined large volumetric flow rate into said first plurality of outlet perforations to form a series of small separate outlet jets which travel a predetermined distance in a direction toward a target surface and impinge thereon, allowing said impinged fluid to flow on said target surface a predetermined distance sufficiently short to coalesce and form a thin laminar boundary layer, and withrawing said impinged coalesced fluid from said target surface through said return perforations as a series of small separate return jets which travel in a direction away from said target surface, said return perforations being spaced apart relative to said outlet perforations a distance sufficiently short to withdraw said impinged fluid flowing on said target surface before it forms a thick laminar boundary layer thereon and thereby create a very thin laminar boundary layer sufficiently thin to transfer heat, mass, and momentum from said target surface at a high transfer rate relative to that achieved by a thicker laminar boundary layer.

2. The method according to claim 1 wherein said series of small separate return jets are withdrawn from said target surface in a direction opposite to that of said series of small separate outlet jets.

3. The method according to claim 1 wherein said first plurality of adjacent closely spaced outlet perforations are interconnected tangentially by said at least one fluid supply channel to cause rotation of fluid passing therethrough, and said step of introducing a fluid at a predetermined large volumetric flow rate into said first plurality of outlet perforations causes said fluid to be discharged as a first series of adjacent small separate rotating vortices spaced apart relative to one another a predetermined distance and rotating in a predetermined direction.

4. The method according to claim 3 wherein said fluid contains particulates, and said first series of adjacent separate rotating vortices are rotating about their respective axis at a velocity sufficient to cause precipitation of said particulates.

5. The method according to claim 3 wherein adjacent ones of said first plurality of adjacent closely spaced outlet perforations are interconnected tangentially by said at least one fluid supply channel to cause rotation of fluid passing therethrough in opposite directions through said adjacent outlet perforations, and adjacent ones of said first series of separate rotating outlet jets form counter rotating vortices rotating in opposite directions, such that they roll upon one another without friction and persist for many diameters downstream toward said target surface, and said step of withdrawing said impinged coalesced fluid from said target surface as said series of small separate return jets includes withdrawing said impinged coalesced fluid into a second series of adjacent small separate return jets formed between said first series of adjacent rotating jets and which travel in a direction away from said target surface.

6. The method according to claim 1 wherein adjacent ones of said first plurality of adjacent closely spaced outlet perforations are interconnected tangentially by said at least one fluid supply channel in laterally opposed relation to cause rotation of fluid passing therethrough in opposite directions, adjacent ones of said second plurality of adjacent closely spaced return perforations are interconnected tangentially by said at least one fluid return channel in laterally opposed relation to cause rotation of fluid passing therethrough in opposite directions, said step of introducing a fluid at a predetermined large volumetric flow rate into said first plurality of outlet perforations includes introducing said fluid threough said at least one fluid supply channel tangentially into said first plurality of said outlet perforations to cause said fluid to be discharged as a first series of adjacent small separate rotating outlet jets spaced apart relative to one another a predetermined distance, with adjacent jets forming counter rotating vortices rotating in opposite directions, such that they roll upon one another without friction and persist for many diameters downstream toward said target surface, and said step of withdrawing said impinged coalesced fluid from said target surface as said series of small separate return jets includes withdrawing said impinged coalesced fluid through said at least one fluid return channel and tangentially into said return perforations to form a second series of adjacent small separate return jets between said first series of adjacent rotating jets which travel in a direction away from said target surface.

7. The method according to claim 6 wherein said step of withdrawing said impinged coalesced fluid from said target surface as said second series of adjacent small separate return jets includes withdrawing said impinged coalesced fluid through said at least one fluid return channel tangentially into said return perforations to form a second series of non-rotating jets between said first series of adjacent rotating jets which travel in a direction away from said target surface opposite the direction of said first series of small separate outlet jets.

8. The method according to claim 1 wherein adjacent ones of said first plurality of adjacent closely spaced outlet perforations are interconnected tangentially by said at least one fluid supply channel to cause rotation of fluid passing therethrough in opposite directions, adjacent ones of said second plurality of adjacent closely spaced return perforations are interconnected tangentially by said at least one fluid return channel to cause rotation of fluid passing therethrough in opposite directions, said step of introducing a fluid at a predetermined large volumetric flow rate into said first plurality of outlet perforations includes introducing said fluid through said at least one fluid supply channel tangentially into said first plurality of said outlet perforations to cause said fluid to be discharged as a first series of adjacent small separate rotating outlet jets spaced apart relative to one another a predetermined distance, with adjacent jets forming co-rotating vortices rotating in the same direction, and said step of withdrawing said impinged coalesced fluid from said target surface sa said series of small separate return jets includes withdrawing said impinged coalesced fluid through said at least one fluid return channel and tangentially into return perforations to form a second series of adjacent small separate return jets between said first series of adjacent co-rotating vortices which travel away from said target surface.

9. The method according to claim 1 in which said series of small separate outlet jets are discharged to travel in an upwardly generally vertical direction and impinge on said target surface with sufficient force to levitate said target surface and said very thin laminar boundary layer created being sufficiently thin to reduce the skin drag of said target surface, such that said target surface is capable of movement normal to said series of small separate outlet jets with little or no retarding friction force, the height of levitation determined by the flow rate of said series of outlet jets and the mass of said target surface, and the height of levitation not exceeding the height at which said impinged coalesced fluid on said target surface is converted into said series of small separate return jets.

10. The method according to claim 1 in which said target surface has a bottom surface and laterally opposed side surfaces, providing at least one said plate adjacent said bottom surface and at least one said plate adjacent each said side surface;

a first series of small separate outlet jets are discharged from said plates to travel in an upwardly generally vertical direction and a second series of said small separate outlet jets are discharged from said plates in a lateral generally horizontal direction to impinge on the bottom and lateral sides of said target surface, respectively, with sufficient force to levitate said target surface and center it between said horizontally directed jets, such that said target surface is capable of movement normal to said series of small separate generally vertical and generally horizontal jets with little or no retarding friction force, the height of levitation determined by the flow rate of said generally vertically directed jets and the mass of said target surface, and the height of levitation not exceeding the height at which said impinged coalesced fluid on said target surface is converted into said series of small separate return jets.

11. The method according to claim 10 in which said first series of small separate outlet jets which are discharged to travel in a lateral generally horizontal direction to impinge on the lateral sides of said target surface are directed at an angle relative to said lateral sides with sufficient force to cause said levitated target surface to travel in a direction away from said generally horizontally directed jets, such that said target surface is capable of movement normal to said generally vertically directed jets with little or no retarding friction force, the height of levitation determined by the flow rate of said vertically directed jets and the mass of said target surface, and the speed of travel of said levitated target surface determined by the angle and the flow rate of said generally horizontally directed jets.

12. The method according to claim 9 in which said target surface is surrounded by a second fluid, and the distance of said impinged fluid flowing on said target surface before being withdrawn into said return jets being sufficient to form a boundary layer that isolates said target surface from said surrounding second fluid, such that said surrounding second fluid moves normal to said series of small separate outlet jets with little or no retarding friction force, and thereby eliminating skin drag and skin heating of said target surface.

13. The method according to claim 1 in which said fluid is air and said target surface is a heat-generating component, said series of small separate outlet jets impinge on said heat-generating component and are allowed to flow on said heat-generating component surface a predetermined distance sufficiently short to coalesce and form a thin laminar boundary layer and are withdrawn from said heat-generating component as a series of small separate return air jets which travel in a direction away from said heat-generating component surface, and said return perforations are spaced apart relative to said outlet perforations a distance sufficiently short to prevent the coalesced air from contacting surrounding heat-generating components and to withdraw said impinged air flowing on the surface of said heat-generating component before it forms a thick laminar boundary layer and thereby create a very thin laminar boundary layer sufficiently thin to transfer heat from said heat-generating component surface, such that said heat-generating component is cooled by the very thin laminar boundary layer and the warm air withdrawn from the surface of said heat-generating component in said return air jets is not mixed with surrounding heat-generating components to maximize cooling of both the target heat-generating component and surrounding heat-generating components.

14. The method according to claim 1 in which said target surface contains a second fluid from which heat is to be transfered, and said series of small separate outlet jets impinge on said target surface a predetermined distance sufficiently short to coalesce and form a thin laminar boundary layer that is withdrawn through said return perforations as said series of small separate return jets which travel in a direction away from said target surface, said return perforations being spaced apart relative to said outlet perforations a distance sufficiently short to withdraw said impinged fluid flowing on said target surface before it forms a thick laminar boundary layer thereon and thereby create a very thin laminar boundary layer sufficiently thin to transfer heat from said target surface to cool said second fluid contained therein, and the heat given up by said target surface is carried away from said target surface in said series of return jets.

15. The method according to claim 1 in which said target surface has a surface coating which is to be removed, said series of small separate outlet jets are discharged to impinge on said target surface with sufficient force to penetrate said surface coating and dislodge particles of said coating from said target surface and displace said dislodged particles in said coalesced fluid laminar boundary layer, and said dislodged coating particles are carried away from said target surface in said series of return jets to clean said target surface.

16. The method according to claim 1 in which said target surface has a surface layer of frozen liquid to be removed, said fluid has a temperature sufficient to melt said frozen liquid, said fluid is discharged as a series of small separate heated outlet jets which impinge on said target surface, and said frozen liquid is melted upon impingement of said series of outlet jets and the melted liquid is carried away from said target surface in said series of return jets.

17. The method according to claim 1 in which said fluid is air and said target surface is a bed of molten slag and pulverized coal, and said series of small separate outlet jets impinge on said bed of molten slag and pulverized coal and flow on the surface thereof a predetermined distance sufficiently short to coalesce and form a thin laminar boundary layer and in the process consume oxygen and produce carbon dioxide gas which is withdrawn through said return perforations as a series of small separate return gas jets which travel in a direction away from the surface of said bed of molten slag and pulverized coal, said return perforations being spaced apart relative to said outlet perforations a distane sufficiently short to withdraw said impinged fluid flowing on said bed of molten slag and pulverized coal before it forms a thick laminar boundary layer thereon and thereby create a very thin laminar boundary layer sufficiently thin to pick up the heat of combustion such that the pulverized coal is burned cleanly and efficiently.

18. The method according to claim 1 in which said fluid is a gas containing sulfur dioxide and said target surface is a film of water containing a solution selected from the group consisting of calcium hydroxide and calcium carbonate, and said series of small separate outlet jets impinge on said film of water and flow thereon a predetermined distance sufficiently short to coalesce and form a thin laminar boundary layer and in the process sulfur dioxide molecules are captured in said film of water and are converted to calcium sulfate or calcium sulfide particles which are carried away in said film of water and resultant clean gas is withdrawn through said return perforations as a series of small separate return clean gas jets which travel in a direction away from the surface of said film of water, such that the gas containing sulfur dioxide is cleaned.

19. The method according to claim 1 in which said fluid is a hot liquid containing liquids selected from the group consisting of depolymerized rubber and aromatic oil and said target surface is a vulcanized rubber tire, and said series of small separate outlet jets are discharged to impinge on said rubber tire with sufficient force and flow on the surface of said rubber tire a predetermined distance sufficiently short to heat the tire surface thereby causing it to absorb a quantity of said hot liquid and swell and to become stressed such that substantial portions of said surface are ripped from said tire until only the tire carcass remains, and to allow the remaining hot liquid to coalesce and form a thin laminar boundary layer which is withdrawn through said return perforations as a series of small separate return liquid jets which travel in a direction away from the surface of said tire surface, said return perforations being spaced apart relative to said outlet perforations a distance sufficiently short to withdraw said impinged hot liquid flowing on the surface of said tire before it forms a thick laminar boundary layer thereon and thereby create a very thin laminar boundary layer sufficiently thin to cause a rapid transformation of the vulcanized rubber to depolymerized rubber.

20. The method according to claim 1 in which said fluid contains chemical particles and said target surface is a surface on which said chemical particles are to be deposited, and said series of small separate outlet jets impinge on said target surface and flow thereon a predetermined distance sufficiently short to coalesce and form a thin laminar boundary layer and in the process said chemical particles contained in said fluid are deposited on said target surface and resultant clean fluid is withdrawn through said return perforations as a series of small separate return clean fluid jets which travel in a direction away from said target surface.

21. The method according to claim 1 in which said fluid is hot air and said target surface is a moisture-laden fabric surface, and said series of small separate outlet jets impinge on said moisture-laden surface surface and flow thereon a predetermined distance sufficiently short to coalesce and form a thin laminar boundary layer which is withdrawn through said return perforations as a series of small separate return air jets which travel in a direction away from said moisture-laden surface, and in the process, causing the moisture in said moisture-laden surface to vaporize and the vapors removed in said series of small separate return air jets.

22. The method according to claim 1 in which said fluid is hot air and said target surface is a surface which has been treated with chemicals which require curing, and said series of small separate outlet jets impinge on said treated surface a predetermined distance sufficiently short to coalesce and form a thin laminar boundary layer which is withdrawn through said return perforations as a series of small separate return air jets which travel in a direction away from said treated surface, and in the process, thereby causing the chemicals on said treated surface to cure.

23. The method according to claim 1 in which there is a hot fluid and a cold fluid and said target surface is at least one flat plate having a front surface and a back surface with a series of inlet apertures and a series of outlet apertures therethrough in adjacent spaced relation, said at least one plate being insulated to allow only lateral heat transfer, said hot fluid is converted into a first plurality of small separate jets which impinge on the front surface of said flat plate and travel through said inlet apertures and the heat of said first hot fluid is transfered laterally through said flat plate, and said cold fluid is converted into a second plurality of small separate jets which impinge on the back surface of said flat plate and travel through said outlet apertures and the heat of said plate is transfered to said second plurality of jets of said cold fluid which travel in a direction away from said at least one flat plate.

24. The method according to claim 1 in which said fluid comprises a mixture of at least two liquids having different boiling points and said target surface has a predetermined temperature sufficient to cause the liquid having the lowest boiling point to evaporate upon impingement, said mixture is discharged as a series of small separate outlet jets which impinge on said target surface, and the liquid having the lowest boiling point is evaporated upon impingement of said series of outlet jets and the vapor is carried away from said target surface in said series of return jets.

25. The method according to claim 1 in which said fluid has a predetermined temperature and said target surface has a predetermined temperature sufficiently lower than said fluid to cause condensation of said fluid, said fluid is discharged as a series of small separate outlet jets which impinge on said target surface, and said fluid is condensed upon impingement of said series of outlet jets and the condensate is carried away from said target surface in said series of return jets.

26. An apparatus for transferring heat, mass, and momentum between at least one fluid and a target surface using a multiplicity of tiny fluid jets comprising:

at least one plate spaced a predetermined distance from a target surface;

said plate having a first plurality of adjacent closely spaced outlet perforations extending to an exterior surface and interconnected by at least one fluid supply channel to cause fluid passing therethrough to be discharged as a series of small separate outlet jets and a second plurality of adjacent closely spaced return perforations extending to an exterior surface and interconnected by at least one fluid return channel to draw fluid therethrough as a series of small separate return jets;

pump means connected with said at least one outlet and return channels to force said fluid at a predetermined volumetric flow rate through said outlet perforations and to draw said fluid from said target surface into said at least one return channel through said return perforations;

said fluid being pumped through said outlet perforations and discharged as a series of small separate outlet jets from said at least one plate to impinge on said target surface and flow a predetermined distance thereon sufficiently short to coalesce and form a thin laminar boundary layer, and upon formation of said thin laminar boundary layer, said coalesced fluid being drawn from said target surface through said inlet perforations as a series of small separate return jets which travel in a direction away from said target surface; and said return perforations being spaced apart relative to said outlet perforations a distance sufficiently short to draw said impinged fluid flowing on said target surface before it forms a thick laminar boundary layer thereon and thereby create a very thin laminar boundary layer which will transfer heat, mass, and momentum between said fluid and said target surface at a high transfer rate relative to that achieved by a thicker laminar boundary layer.

27. The apparatus according to claim 26 wherein adjacent ones of said outlet perforations are interconnected tangentially by said at least one fluid supply channel in laterally opposed relation to cause rotation of said fluid passing therethrough and formation thereof into a first series of adjacent small separate rotating outlet jets with adjacent jets rotating in opposite directions to form counter-rotating vortices which roll upon one another without friction and persist for many diameters downstream toward said target surface, and adjacent ones of said return perforations are interconnected tangentially by said at least one fluid return channel in laterally opposed relation to cause rotation of said impinged coalesced fluid on said target surface and formation thereof into a second series of adjacent small separate return jets formed between said first series of adjacent counter-rotating jets which travel in a direction away from said target surface.

28. The apparatus according to claim 26 wherein adjacent one of said outlet perforations are interconnected tangentially by said at least one fluid supply channel to cause rotation of said fluid passing therethrough and formation thereof into a first series of adjacent small separate rotating outlet jets with adjacent jets rotating in the same direction to form co-rotating vortices, and adjacent ones of said return perforations are interconnected tangentially by said at least one fluid return channel to cause rotation of said impinged coalesced fluid on said target surface and formation thereof into a second series of adjacent small separate return jets formed between said first series of adjacent co-rotating jets which travel in a direction away from said target surface.

\* \* \* \* \*